(12) United States Patent
Yoneda et al.

(10) Patent No.: US 6,229,663 B1
(45) Date of Patent: *May 8, 2001

(54) DISK DRIVE LOADING/UNLOADING APPARATUS AND METHOD FOR CONTROLLING THE APPARATUS

(75) Inventors: Isao Yoneda, Yokohama; Hiroshi Uchiike, Yamato; Shinji Ueno; Kenji Ogasawara, both of Fujisawa; Yoshihiko Aoki, Ebina; Fuminori Sai, Yokohama, all of (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,971

(22) Filed: Jun. 22, 1998

(30) Foreign Application Priority Data

Jun. 27, 1997 (JP) ...................................................... 9-171849

(51) Int. Cl.[7] .................................................... G11B 21/12
(52) U.S. Cl. ............................................................... 360/75
(58) Field of Search .................................. 360/75, 78.04, 360/78.06, 78.09

(56) References Cited

U.S. PATENT DOCUMENTS

| | | | |
|---|---|---|---|
| 4,864,437 | * | 9/1989 | Couse et al. ............................. 360/75 |
| 5,768,045 | * | 9/1999 | Patton, III et al. ................ 360/78.04 |
| 5,949,608 | * | 9/1999 | Hunter ................................. 360/78.09 |

FOREIGN PATENT DOCUMENTS

| | | |
|---|---|---|
| 59-92796 | 5/1984 | (JP) . |
| 2622003 | 3/1991 | (JP) . |
| 07-221643 | 8/1995 | (JP) . |
| 08-063920 | 3/1996 | (JP) . |
| 09-168290 | 6/1997 | (JP) . |

* cited by examiner

Primary Examiner—Hoa T. Nguyen
Assistant Examiner—James L Habermehl
(74) Attorney, Agent, or Firm—Noreen A. Krall; Robert B. Martin

(57) ABSTRACT

The present invention provides a disk drive, a loading/unloading apparatus, and a method for controlling the apparatus, capable of improving the reliability of data by performing stable speed control. A disk drive comprises a VCM spindle driver for rotating a disk, a magnetic head, an actuator mechanism for moving a head slider having the magnetic head to a position above the surface of the magnetic disk and an unloaded position, a ramp block, and a CPU/HDC for performing the speed control of an actuator and the calibration control for detecting the offset and dynamic range of an AD converter before the speed control and controlling the operation for reading or writing data from or into the disk, which increases a rectangular current value to be applied to a voice coil while successively changing codes, measures an offset in accordance with the AD converter value for each current value, and moreover measures a dynamic range by deciding a nonlinear area when the difference between the expected value and measured value of the AD converter becomes a predetermined value or more.

50 Claims, 16 Drawing Sheets

CONVENTIONAL METHOD

MEASURING METHOD USING BIAS CURRENT
ACCORDING TO PRESENT METHOD

CHANGE OF ALLOWABLE MAXIMUM CURRENT VALUES
TO BE IMPROVED BY FLOWING VCM CURRENT

DISK DRIVE LOADING/UNLOADING APPARATUS AND METHOD FOR CONTROLLING THE APPARATUS

BACKGROUND OF THE INVENTION

1. Field of the Invention

The present invention relates to a disk drive having a loading/unloading mechanism for loading or unloading a head slider for writing or reading information to or from a recording medium, a loading/unloading apparatus, and a method for controlling the apparatus.

2. Description of Related Art

In a disk drive which rotates a recording medium such as a magnetic disk and raises a head slider mounted on a suspension assembly comprising a head arm of an actuator mechanism from the disk surface by an air bearing produced due to the rotation of the disk, the head slider lands on an unloading area on the disk surface under a non-operation state in which the disk stops its rotation. The unloading area is formed outside of a data area. This type of disk drive is referred to as a contact-start/stop-type disk drive.

Problems encountered in above described contact-start disk drive, include the hazard that the head slider may be attracted by the data area surface or may be moved to the data area due to impact, both of which would damage the disk surface. Therefore, to avoid such hazards and improve the reliability under a non-operation state, a disk drive referred to as a head-loading/unloading-type disk drive was developed. The head-loading/unloading-type disk drive is provided with a head loading/unloading mechanism. The head loading/unloading mechanism includes a head holding mechanism comprising a head-arm suspension assembly and a ramp block which unloads a head slider to an unloaded position without bringing the head slider into contact with the surface of the disk by making the ramp block hold the suspension assembly when the disk drive is not operated. A tab having a protrusion is provided for the suspension assembly and a ramp is formed on the ramp block. The ramp block is set so that the ramp is located nearby the outer track on the disk. The ramp surface is a composite plane having a fist slope, second slope, and tab holding plane. It is also possible to form a horizontal plane (apex plane) between the first slope and the second slope.

To stop the operation of the disk drive, the head loading/unloading mechanism unloads the head slider by rotating the head arm and mounting the tab protrusion of the suspension assembly on the tab holding plane of the ramp. When unloading the head slider, the tab protrusion first contacts the first slope of the ramp, slides on the first and second slopes, and reaches the tab holding plane. Moreover, when the disk drive starts its operation, the head loading/unloading mechanism rotates the head arm to load the head slider to a position above the surface of a rotating disk. When loading the head slider, the tab protrusion slides on the tab holding plane, the second and first slopes and then separates from the first slope.

One limitation of the head loading/unloading mechanism is that it is not generally provided with a special sensor for detecting the position and moving speed of the head slider on the ramp and planes. The speed of the actuator may be controlled by detecting a back electromotive voltage generated at the both ends of a head-moving DC motor (for example the voice coil motor or VCM). The actuator including the VCM is driven by a VCM driving circuit. However, when the actuator moves, a back electromotive voltage is generated at the both ends of the VCM coil. By detecting the back electromotive voltage generated at both ends of the VCM coil and using it as a control object, it is possible to control the speed of the head slider under loading or unloading. To perform stable speed control, it is indispensable to accurately detect a back electromotive voltage serving as speed control information.

However, a disk drive provided with this type of conventional head loading/unloading mechanism has a problem in improving the reliability of the speed control of a head slider under loading or unloading because of the following reasons.

First, when measuring the back electromotive voltage generated at the both ends of the VCM coil with an AD converter and using it as a control object, the current supplied to the VCM coil and the present reading of the AD converter may not show a linear characteristic. That is, a nonlinear area which is not showing a linear characteristic actually expected from the viewpoint of the characteristic of hardware is present. Therefore, to accurately control a head slider under loading or unloading, it is necessary to perform speed control within a linear-operation range. The nonlinear area may fluctuate depending on the operating condition even in the case of an individual apparatus or the same apparatus. Moreover, as described later, because there is a fluctuation in offset values and a fluctuation in VCM coil resistances due to temperature, it is necessary to control speed in a linear operation range by also considering these fluctuation factors.

The speed of a head slider is conventionally controlled without detecting an effective linear operation range of hardware. Therefore, if a control current exceeds a linear operation range and reaches a nonlinear operation range when, for example, the friction of the ramp increases, oscillation or an unexpected control error occurs and speed control may be disabled. As a result the disk may be damaged and user data lost. Moreover, optimum speed control may not be performed because an effective linear operation range of hardware is not detected.

Second, when measuring a back electromotive voltage generated at both ends of the VCM coil with an AD converter and using it as a control object, the value of the AD converter when a control current is zero (that is, offset value) is necessary in order to compute a back electromotive voltage component.

Conventionally, current is actually decreased to zero and the present value of an AD converter is used as an offset value. However, because the current is zero, no force is applied to the actuator at all. Therefore, if a disturbance in the rotational direction is received during the above period, the actuator easily moves while an offset value is measured. Then, a back electromotive voltage is generated because the coil crosses the magnetic field of a VCM, the magnetic field influences the measurement by the AD converter, and thus any accurate offset value cannot be obtained. Moreover, even if voltage fluctuation occurs in addition to the above disturbance, it may influence the measurement of an offset value.

If speed control is started before an accurate offset value is obtained, as control is performed by using the difference from an offset value as the present speed, it is impossible to set a correct target and load a head on a disk at a safe speed. Therefore, the possibility that the disk will be damaged increases and the reliability of data is influenced. As a result, for same reason, greater time is required for unloading.

Lastly, a back-electromotive-voltage detection circuit for detecting the above back electromotive voltage comprises a bridge circuit of a resistance using an operational amplifier. The voltage at both ends of the VCM coil is detected as a back electromotive voltage component by balancing resistance values. However, the VCM coil is subject to temperature changes and the resistance value of the coil greatly changes depending on temperature. For example, when the coil temperature rises, a back electromotive voltage is inaccurately detected due to collapse of the balance of the circuit and a maximum current to be applied to the coil is limited. Because a sufficient amount of current cannot be obtained for the above reason, instability is added to the speed control of a head to a disk. Similarly, then the temperature is low (for example when a power supply is turned on), the resistance value of the coil is lowered, the circuit balance collapses, and a maximum current is limited. This may cause the inability to load the head onto the disk from the ramp.

As described above, in the case of a disk drive provided with a conventional head loading/unloading mechanism, the reliability of speed control of a head slider under loading or unloading is reduced because the risk of disk damage caused by performing speed control in a nonlinear area due to hardware characteristics when detecting a back electromotive voltage. Moreover, offset value fluctuation impairing the speed control state in the effective linear area of the hardware and the change of coil resistance values due to temperature change occur.

It therefore can be seen that there is a need to provide a more accurate apparatus and method for controlling speed in the loading and unloading of a head slider to/from a disk surface.

SUMMARY OF THE INVENTION

It is the first object of the present invention to provide a disk drive capable of detecting an effective linear operation range and improving the reliability of data by performing stable speed control, a loading/unloading apparatus, and a method for controlling the apparatus.

It is the second object of the present invention to provide a disk drive capable of detecting an accurate offset value even if there is disturbance such as vibration or voltage fluctuation and improving the reliability of head loading/unloading and the reliability of data, a loading/unloading apparatus, and a method for controlling the apparatus.

It is the third object of the present invention to provide a disk drive capable of improving the reliability of a hard disk by removing the unstable factor of speed control in which a head and slider damage the disk even if there is a temperature change and more stably loading or unloading a head onto or from a ramp, a loading/unloading apparatus, and a method for controlling the apparatus.

A disk drive according to the present invention comprises a head for reading or writing data from or to a recording medium and a loading/unloading mechanism for loading or unloading the head onto or from the recording medium by driving the head with an actuator provided with a voice coil motor. The disk drive further comprises back-electromotive-voltage detection means for detecting a back electromotive voltage generated in the voice coil motor, AD conversion means for converting the detected back electromotive voltage into a digital signal, and control means for controlling the speed of the actuator by using an AD-converted back electromotive voltage as a control object, in which calibration means for measuring the dynamic range of the AD conversion means is included and the control means performs speed control in accordance with the measured dynamic range.

A second embodiment of a disk drive according to the present invention comprises a head for reading or writing data from or to a disk recording medium and a loading/unloading mechanism for loading or unloading the head onto or from the recording medium by driving the head with an actuator provided with a voice coil motor. The disk drive further comprises back-electromotive-voltage detection means for detecting a back electromotive voltage generated in the voice coil motor, AD conversion means for converting the detected back electromotive voltage into a so digital signal, and control means for controlling the speed of the actuator by using an AD-converted back electromotive voltage as a control object, in which calibration means for measuring the offset of the AD conversion means is included and the control means performs speed control in accordance with the measured offset.

A third embodiment of a disk drive according to the present invention comprises a head for reading or writing data from or into a disk recording medium and a loading/unloading mechanism for loading or unloading the head onto or from the recording medium by driving the head with an actuator provided with a voice coil motor. The disk drive further comprises back-electromotive voltage detection means for detecting a back electromotive voltage generated in the voice coil motor, AD conversion means for converting the detected back electromotive voltage into a digital signal, and control means for controlling the speed of the actuator by using an AD-converted back electromotive voltage as a control object, in which the back-electromotive-voltage detection means is provided with a bridge circuit for detecting the voltage generated in the coil of the voice coil motor as a back electromotive voltage by balancing the resistance of the coil with a predetermined resistance and the bridge circuit is balanced in accordance with the resistance value of the coil when the coil has ordinary temperature.

Moreover, the above calibration means can use means for increasing a rectangular current value to be applied to a voice coil while successively changing codes and measuring a dynamic range in accordance with the saturation level of the AD conversion means value for each current value.

Furthermore, the above calibration means can use means for deciding a nonlinear area when the difference between the expected value and the measured value of AD conversion means becomes a predetermined value or more.

Furthermore, the above calibration means can use means for storing the measured value of AD conversion means as past value and deciding a nonlinear area and using the stored past data when the difference between the expected value and the measured value of the AD conversion means becomes a predetermined value or more.

Furthermore, the above calibration means can use means for increasing a rectangular current value to be applied to a voice coil while successively changing codes and measuring an offset in accordance with the AD conversion means value for each current value.

Furthermore, the above calibration means can use means for supplying a plurality of currents (however, excluding zero) to a voice coil and measuring the value of AD conversion means when an applied current is zero as an offset by means of the primary interpolation in accordance with the AD conversion means value for each current value.

Furthermore, a disk drive according to the present invention is provided with means for judging the degree of balance to supply current to a coil until a predetermined balance degree is obtained.

In accordance with the present invention, a loading/unloading apparatus to load or unload the head onto or from the recording medium by driving the head with an actuator provided with a voice coil motor comprises back-electromotive-voltage detection means for detecting a back electromotive force generated in the voice coil motor, AD conversion means for converting the detected back-electromotive voltage into a digital signal, control means for controlling the speed of the actuator by using the AD-converted back electromotive voltage value as a control object, and calibration means for measuring the dynamic range of the AD conversion means; in which the calibration means increases a rectangular current value to be applied to a voice coil while successively changing codes and measures a dynamic range in accordance with the saturation level of the AD conversion means value for each current value.

In accordance with the present invention, the loading/unloading apparatus comprises back-electromotive-voltage detection means for detecting a back electromotive force generated in the voice coil motor, AD conversion means for converting the detected back-electromotive voltage into a digital signal, control means for controlling the speed of the actuator by using the AD-converted back electromotive voltage value as a control object, and calibration means for measuring the offset of the AD conversion means; in which the calibration means increases a rectangular current value to be applied to a voice coil while successively changing codes and measures an offset in accordance with the AD conversion means value for each current value.

In accordance with the present invention, the loading/unloading apparatus to load or unload the head onto or from the recording medium by driving the head with an actuator provided with a voice coil motor comprises back-electromotive-voltage detection means for detecting a back electromotive force generated in the voice coil motor, AD conversion means for converting the detected back-electromotive voltage into a digital signal, control means for controlling the speed of the actuator by using the AD-converted back electromotive voltage value as a control object, and calibration means for measuring the offset of the AD conversion means; in which the calibration means supplies a plurality of currents (excluding zero) to a voice coil and measures the value of the AD conversion means when an applied voltage is zero as an offset by means of the primary interpolation in accordance with the AD conversion means value for each current value.

A loading/unloading apparatus of the present invention for loading or unloading the head onto or from the recording medium by driving the head with an actuator provided with a voice coil motor comprises back-electromotive-voltage detection means for detecting a back electromotive force generated in the voice coil motor, AD conversion means for converting the detected back-electromotive voltage into a digital signal, and control means for controlling the speed of the actuator by using the AD-converted back electromotive voltage value as a control object; in which the back-electromotive-voltage detection means includes a bridge circuit for detecting a voltage generated in the coil of a voice coil motor as a back electromotive voltage by balancing the resistance of the coil with a predetermined resistance and the bridge circuit is balanced in accordance with the resistance value of the coil when the coil has ordinary temperature.

A method of the present invention for controlling a loading/unloading apparatus comprises the steps of judging the degree of a bridge circuit constituted so as to be balanced in accordance with the resistance value of a coil when the coil has ordinary temperature, improving balance by supplying a current to the coil until a predetermined balance is obtained when the predetermined balance is not realized, increasing a rectangular current value to be applied to a voice coil while successively changing codes, measuring an offset in accordance with the AD conversion means value for each current value, measuring a dynamic range in accordance with the saturation level of the AD conversion means value for each current value, and executing loading/unloading control in accordance with a measured result.

DETAILED DESCRIPTION OF THE PREFERRED EMBODIMENT

A disk drive of the present invention can be applied to a small HDD having a loading/unloading mechanism.

Figure 1:
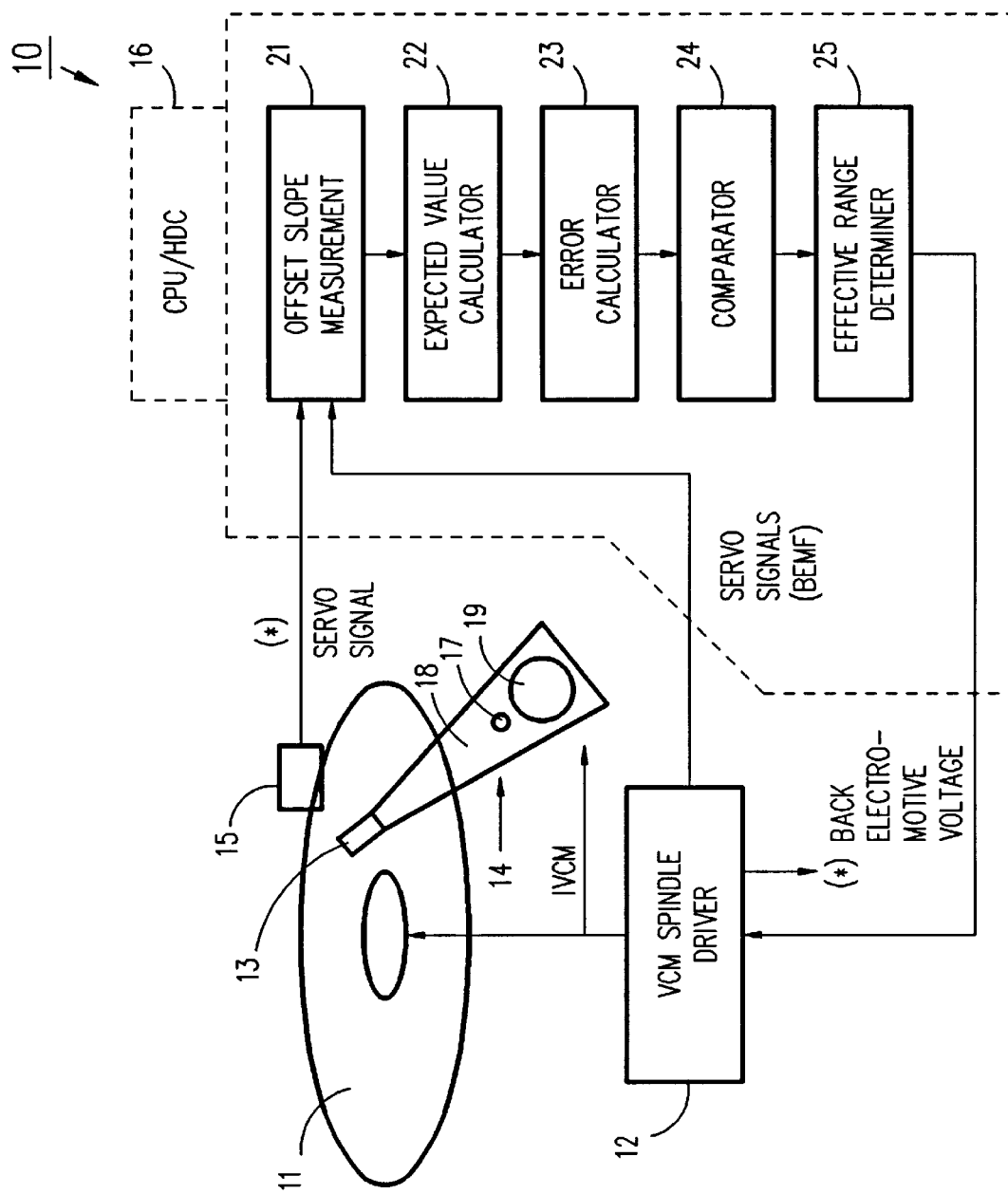
FIG. 1 is a block diagram showing the structure of the disk drive of the first embodiment to which the present invention is applied.

First Embodiment:

FIG. 1 is a block diagram showing the structure of the disk drive according to the first embodiment of the present invention.

In FIG. 1, a disk drive 10 comprises a disk 11 such as a magnetic disk serving as a data recording medium, a VCM spindle driver 12 including a spindle motor for rotating the disk 11, a magnetic head 13 for reading or writing data from or into the disk 11, an actuator mechanism 14 for moving a head slider having the magnetic head 13 to a position above the surface of the magnetic disk 11 or an unloaded position, a ramp block 15, and a CPU/hard-disk controller (HDC) 16 for performing the speed control of an actuator and the calibration control for detecting an operating range and an offset value before the speed control, and controlling the operation such as data read/write operation for the disk 11. The disk drive is provided with a head loading/unloading mechanism which loads a head slider to a position above the surface of the disk 11 when starting an operation and unloads the head slider from the position above the surface of the disk 11 to an unloaded position when stopping the operation.

The disk 11 is secured to the rotor portion of the spindle motor. The disk 11 rotates about the spindle shaft of the spindle motor when the disk drive 10 operates and stops its rotation (stands still) when the disk drive 10 is not operating. Tracks including a data area in which data will be recorded and a servo area in which servo data is previously recorded are concentrically arranged on the surface of the disk 11. One disk 11 or a plurality of disks 11 is or are mounted on the rotor.

The VCM spindle driver 12 comprises a spindle motor for rotating the disk 11 and a back-electromotive-voltage detection circuit for detecting a back electromotive voltage.

The actuator mechanism 14 has a head suspension mechanism (not illustrated), an arm 18 swingably supported by a pivot 17, and a voice coil motor (VCM) 19 for rotating the arm 18. Moreover, the voice coil motor (VCM) 19 is driven by a not-illustrated VCM driving circuit.

When the head slider having the magnetic head 13 is present at a position above the surface of the magnetic disk 11, a signal showing a head position is input to the CPU/HDC 16. Moreover, when loading or unloading the head slider, a back electromotive voltage (*) detected by the back-electromotive-voltage detection circuit in the VCM spindle driver 12 is input to the CPU/HDC 16.

The ramp block 15 is set to the radius-directional outside of the disk 11 and has a plurality of ramps (RAMP) protruded in the horizontal direction from the side of the ramp block 15. A recess for stably holding a tab protrusion is formed on each ramp at a position where the head slider does not contact the outer track on the disk 11.

The CPU/HDC 16 is constituted by forming a CPU for performing the speed control of an actuator and the calibration control for detecting the effective linear operation range of hardware before the speed control, an HDC for controlling the data read/write operation for the disk 11, an amplifying circuit for amplifying a position detection signal or a signal for detecting the above back electromotive voltage, a waveform shaping circuit, an analog-to-digital converter (AD converter), and a digital-to-analog converter (DAC) into a module.

Particularly, the CPU/HDC 16 has an offset slope measuring section 21, an expected-value calculator 22, an error calculator 23, a comparator 24, and an effective-range determiner 25 as circuit sections for performing the calibration control. Though these circuit sections can be constituted with hardware such as electronic circuits, they are realized by software in accordance with the arithmetic processing by a CPU in the case of this embodiment.

Moreover, when the disk drive 10 stops its operation, the VCM/Spindle driver 12 supplies a driving current to the voice coil 19 of the actuator mechanism 14, rotates the arm 18, and unloads the head slider from a position above the surface of the disk 11 to an unloaded position. Furthermore, when the disk drive 10 starts its operation, the VCM/Spindle driver 12 rotates the arm 18 and loads the head slider to a position above the surface of the disk 11 starting its rotation. Furthermore, the VCM/Spindle driver 12 moves the head slider to a desired data area in accordance with the servo data read by the magnetic head 13 of the head slider. FIG. 1 shows a state in which a head slider is loaded.

Operations of the disk drive 10 constituted as mentioned above are described below. First, however, the basic concept of the present invention is described.

When a hard disk drive having a mechanism for loading or unloading an actuator onto or from a ramp performs the speed control of the actuator by detecting a back electromotive voltage generated at the both ends of a VCM coil with a back-electromotive-voltage detection circuit, inputting the detected back electromotive voltage to a CPU through an AD converter, and using the input back electromotive voltage as a control object, the current supplied to the VCM coil (referred to as a VCM current) or the then value of the AD converter may not show an actually-expected linear characteristic because of the characteristic of hardware when the back electromotive voltage is zero.

Figure 2:
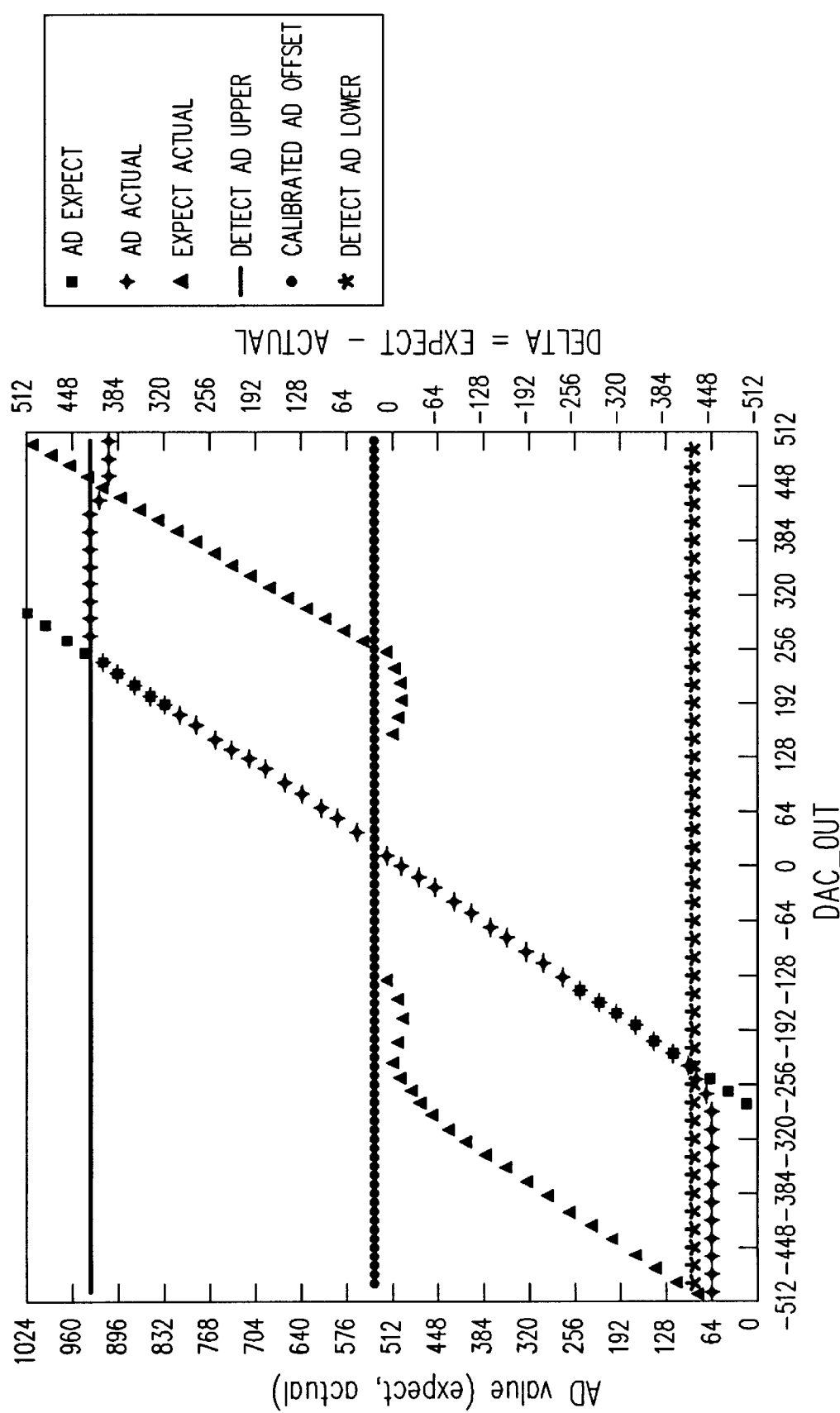
FIG. 2 is a characteristic diagram showing the relation between the DAC output sent from a CPU corresponding to the VCM current and the AD converter value of the disk drive in FIG. 1.

FIG. 2 is a characteristic diagram showing the relation between the DAC output sent from the CPU corresponding to the VCM current and the value of the AD converter, in which symbol "[ ]" (boarder coating) denotes an expected value of the AD converter, "<>" denotes a measured value of the AD converter, "- " (straight line) denotes the upper limit value of the AD converter found out of these values, "o" denotes a measured offset value, and "*" denotes the lower limit value of the AD converter.

As shown in FIG. 2, the characteristics of the VCM current and AD converter value are linear characteristics having a certain offset value and a certain inclination. As shown by symbol "<>", however, vicinities of the upper-limit and lower-limit values of the AD converter form nonlinear areas.

Therefore, it is indispensable to perform the calibration control for detecting the effective range of hardware, that is, the linear area related to the VCM current and AD converter value before performing high-reliability loading from a ramp through speed control and moreover, it is necessary to perform the calibration control on the ramp before loading control is started.

Hereafter, the reason why the calibration control is necessary is described below in detail.

Figure 3:
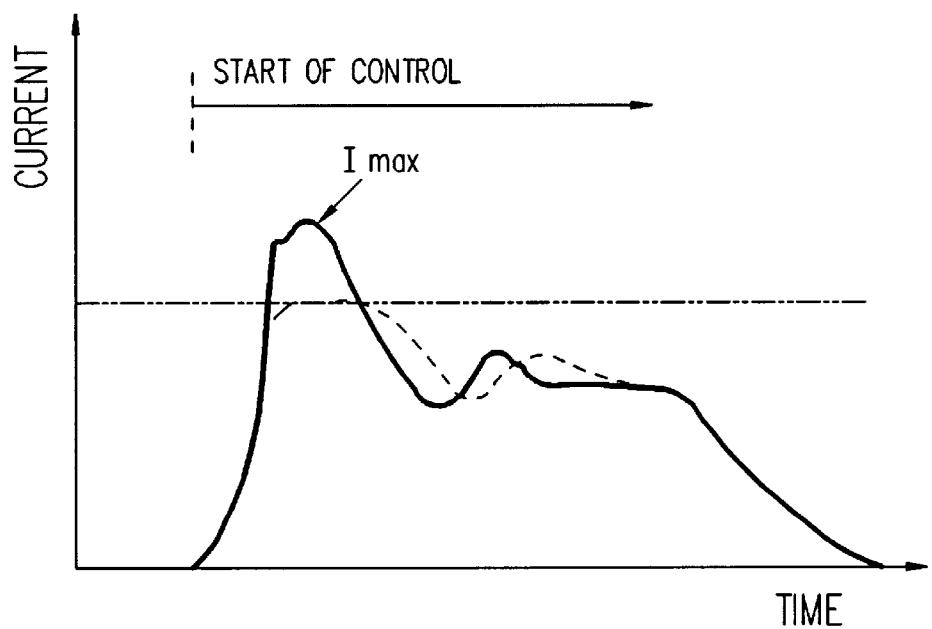
FIG. 3 is an illustration showing current application for explaining the speed control of an actuator by the disk drive in FIG. 1 during loading.

FIG. 3 is an illustration showing an applied voltage for explaining the speed control of an actuator under loading. As shown in FIG. 3, when an actuator loads a loading ramp, a large current value is required due to the initial static friction or the like immediately after speed control is started and thereafter, the speed control for applying the current shown by the continuous line in FIG. 2 is performed. This speed control assumes that the relation between VCM current and AD converter value is kept in a linear area.

In the case of the conventional example, however, the effective range of hardware, that is, the dynamic range is not obtained though the characteristic inclination and offset shown in FIG. 2 are measured. Therefore, when current exceeds the range to perform an operation when the friction of a ramp increases, this serves as a factor for causing a hard disk to damage because of reaching a nonlinear area or resulting in an oscillation or speed-control disabled state. For example, when It the area up to the chain line in FIG. 3 is allowed as an upper-limit linear range, control of the current exceeding the range may cause an unexpected control error. Specifically, when performing speed control in a nonlinear area without detecting the effective linear operation range of hardware, an unexpected control error occurs and the speed for a head to be bound for a disk cannot be controlled. As a result, the disk may be damaged or user data may be lost.

To avoid the above state, the present invention improves the reliability of data by detecting an operation range and performing stable speed control. For example, by detecting an operation range, it is possible to perform the speed control for applying a current shown by the broken line in FIG. 3.

The present invention recognizes the fact that an actuator continuously stands still by applying a predetermined rectangular current while changing the codes (polarities) of the current and thereby, create a structure for detecting the effective operation range of hardware by increasing a rectangular current value while changing the codes of current and measuring the AD converter value for each current value.

Figures 4A, 4B:
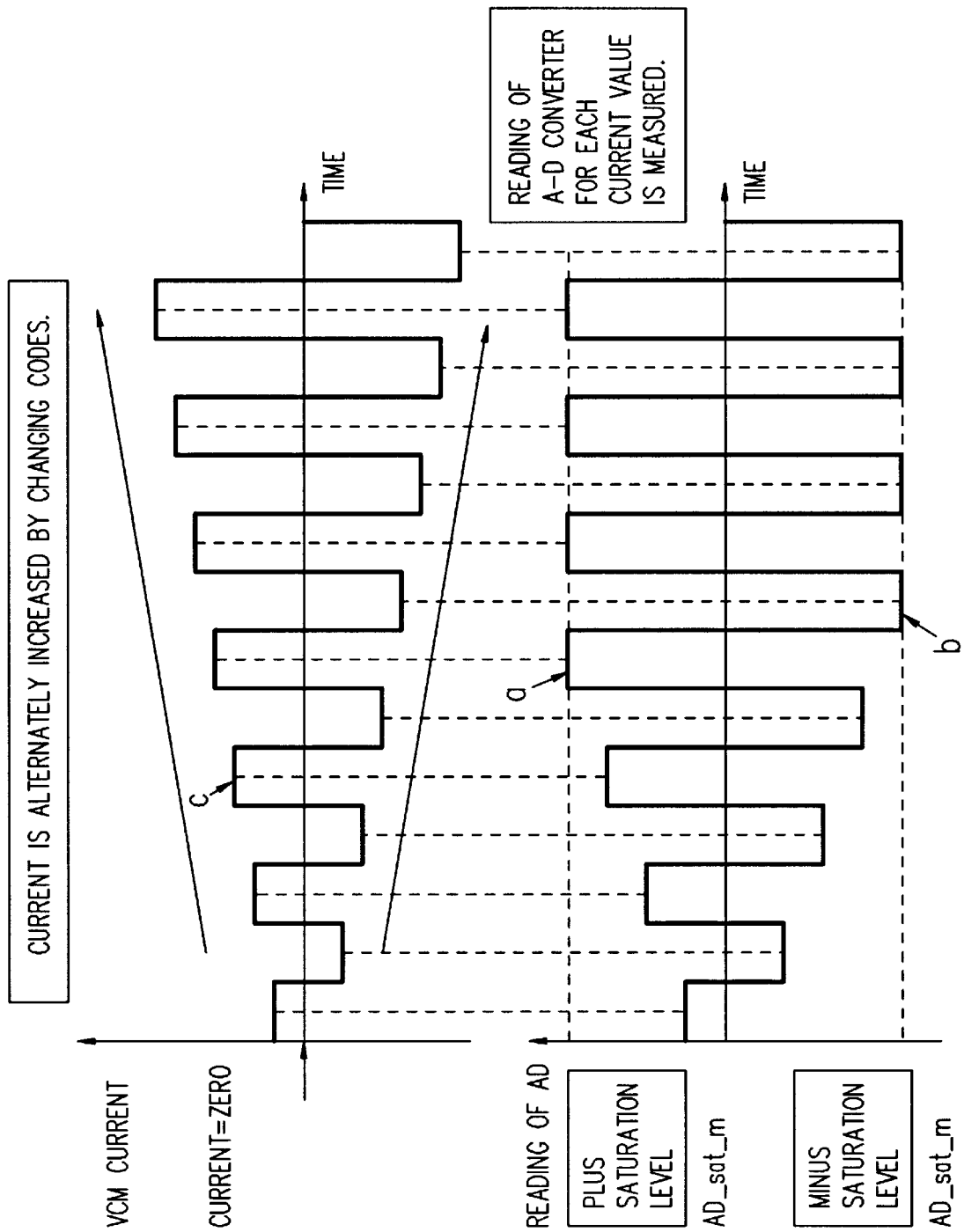
FIGS. 4(A) and 4(B) are illustrations showing the relation between the VCM current under calibration by the disk drive in FIG. 1 and the reading of an AD converter.

FIGS. 4(A) and 4(B) are illustrations showing the relation between the VCM current under calibration and the reading of an AD converter.

(1) First, a proper initial current value is supplied to a VCM coil for a certain time and the then value of the AD converter is read.

(2) A rectangular current value to be applied to the VCM coil is increased while successively changing codes and the value of the AD converter is stored for every current value. The inclination of the linear characteristic when reaching a certain current value, that is, the change rate of the value of the AD converter to the current value is obtained and the value of the AD converter when the current value is zero, that is, the offset is obtained.

(3) Hereafter, when the expected value calculated from the inclination and offset and the actual value of the AD converter exceed certain criteria, the current value applied in a proper period before the expected value and the actual value exceed the criteria and the then value of the AD converter form an actually-measured dynamic range. For example, as shown in FIG. 4(B), symbol "a" denotes a plus saturation level, "b", denotes a minus saturation level, and the saturation area range of the both shows a dynamic range. Moreover, the offset is present in a range in which the linearity is assured to a certain extent in the dynamic range.

(4) Each current value is successively measured while changing codes. Thereby, an actuator does not start moving in one direction on a ramp and it is possible to measure the AD converter characteristic of a current pair at the both ends. Therefore, when the saturation levels shown in FIG. 4(B) are present, it is possible to consider them as the saturation area of hardware. For example, when the saturation area of hardware is shown by the broken line in FIG. 3, current is clipped at this value.

Then, operations of the disk drive 10 are described below in detail in accordance with the above basic concept.

Figure 5:
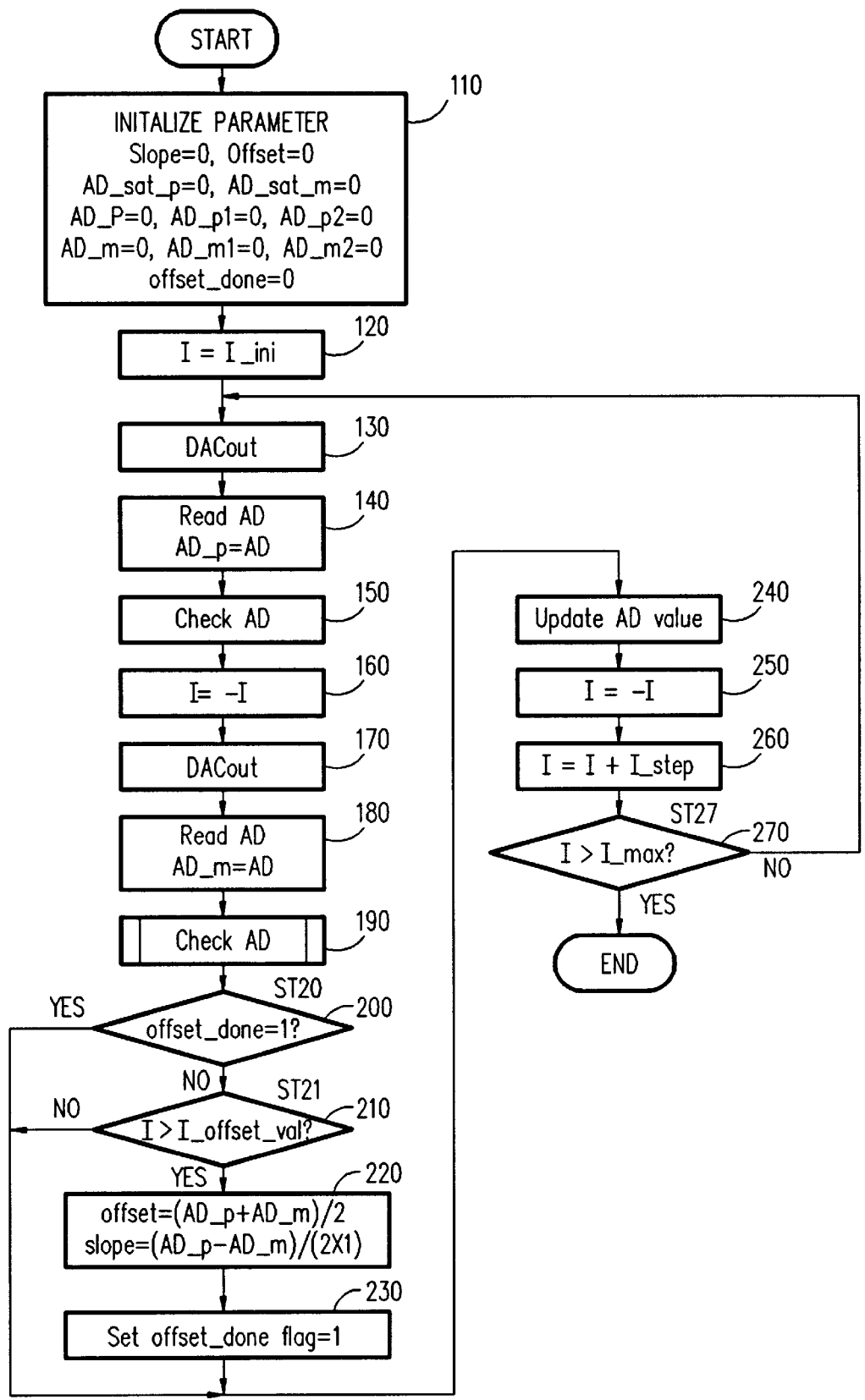
FIG. 5 is a flow chart showing the calibration control operation by the disk drive in FIG. 1.
Figure 7:
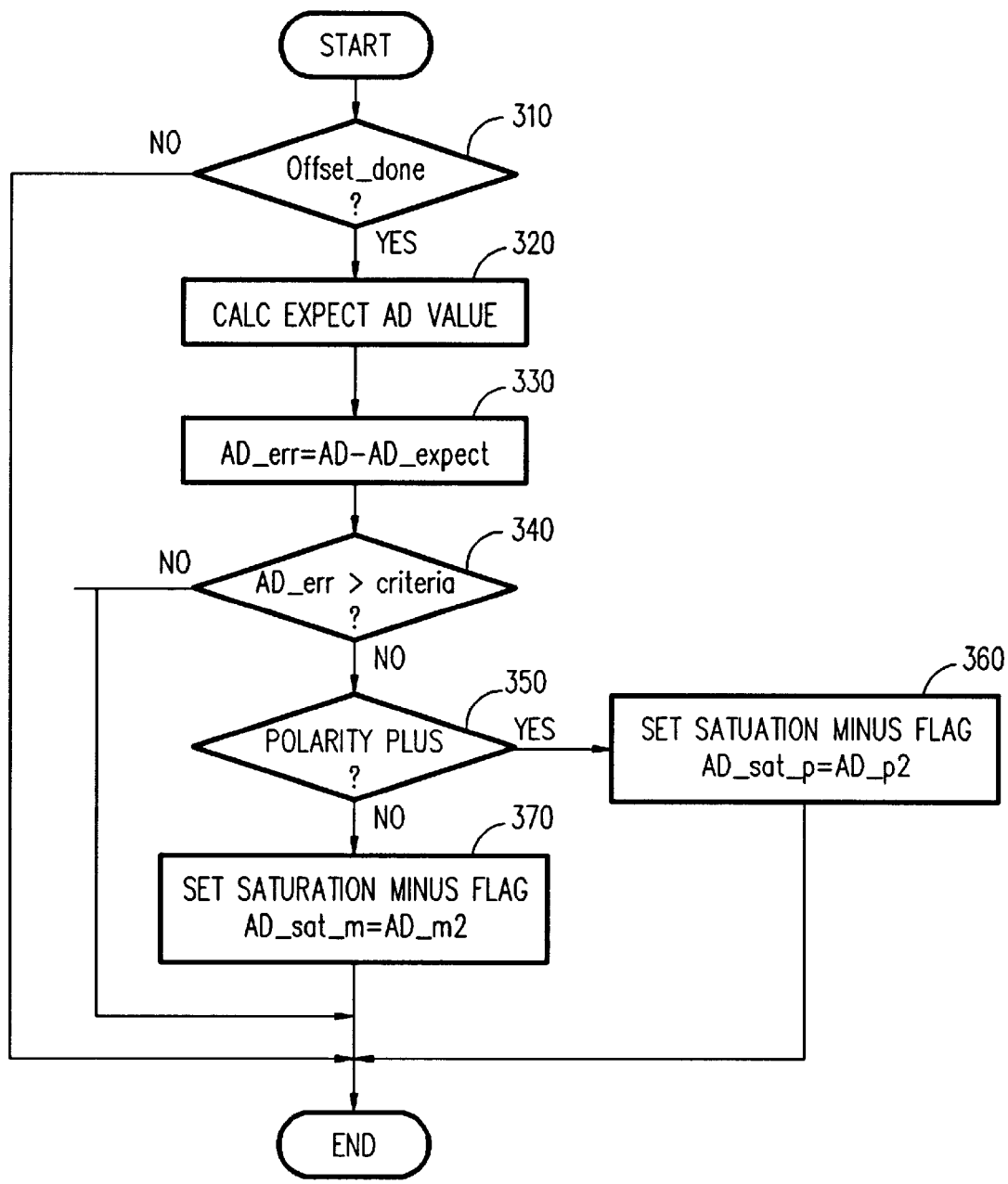
FIG. 7 is a flow chart showing a subroutine for executing the CheckAD processing by the disk drive in FIG. 1.
Figure 9:
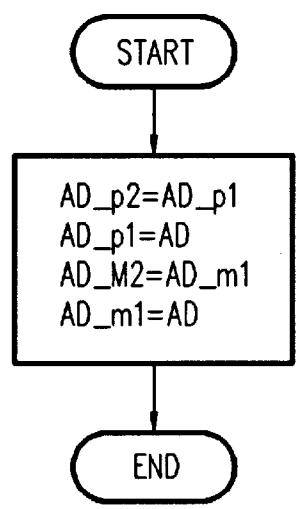
FIG. 9 is a flow chart showing a subroutine for executing the Update AD value processing by the disk drive in FIG. 1.

FIGS. 5, 7, and 9 are flow charts showing the operation for the above calibration control, in which FIG. 5 shows the main flow of the flow charts, and FIGS. 7 and 9 show the operations of the subroutine of the flow chart. In FIGS. 5, 7, and 9, symbol denotes a step of the flow.

This flow is executed by the CPU/HDC 16 every time before loading/unloading control. Moreover, when power supply is turned on and a head is not present on a disk (that is, when the servo information showing the position of the head on the disk cannot be read), an actuator is unloaded up to the outermost of the RAMP and then, this flow starts.

In FIG. 5, when the program first starts, each parameter is initialized in step 110. Parameters include the following and they are initialized (=0).

Linear-characteristic inclination Slope=0,
Middle point offset of value of AD converter corresponding to offset=0,
Plus saturation level AD_sat_p=0 (Refer to FIG. 8),
Minus saturation level AD_sat_m=0,
Present value AD_p of AD converter in plus direction=0,
Value AD_p1 one position before present value of AD converter in plus direction=0,
Value AD_p2 two positions before present value of AD converter in plus direction=0,
Present value AD_m of AD converter in minus direction=0,
Value AD_m1 one position before present value of AD converter in minus direction=0,
Value AD_m2 two positions before present value of AD converter in minus direction=0,
"Flag offset_done?" showing that middle point is obtained= 0.

The above AD_p1, AD_p2, AD_m1, and AD_m2 are past values of present values AD_p and AD_m. These past values are used when the measured value and expected value of the AD converter exceed predetermined criteria. Moreover, though the middle point is obtained when two or three values of the AD converter are obtained, flag offset_done represents that obtaining the middle point is completed.

Then, in step 120, a rectangular current I to be applied to the VCM coil is initialized (I=I_ini). In this case, the rectangular current I to be applied can be started with I=0. However, this embodiment decreases the processing time by applying a current while successively changing codes starting with an optional current value. For example, in the case of FIG. 4(A), though an example of measurement starting with I=0 is schematically shown, current measurement is started with the current value shown by symbol "c".

In steps 130 to 150, read of the AD converter in the plus direction is performed. After reversal, however, read of the AD converter in the minus direction is performed in steps 160 to 190.

Figure 6A:
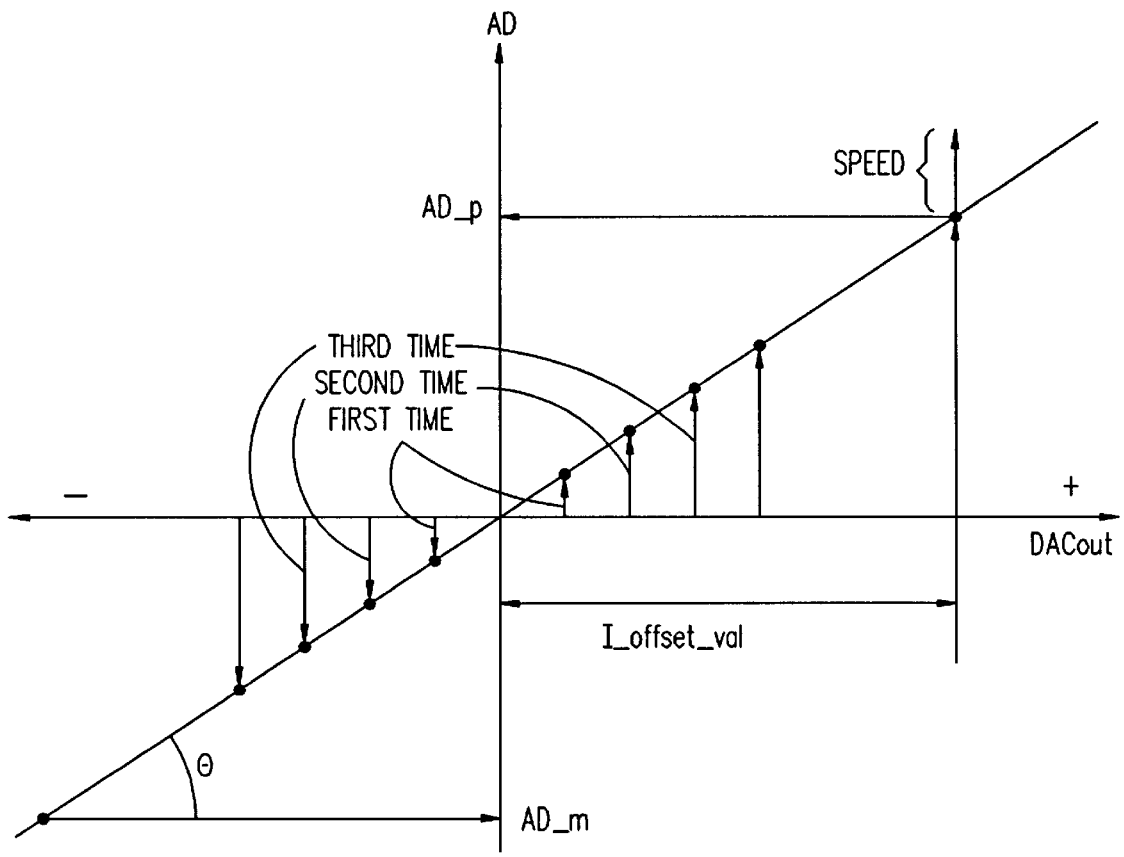
FIGS. 6(a) and 6(b) are illustrations for explaining the calibration control operation by the disk drive in FIG. 1.

That is, a predetermined VCM current is output (DACout) from the CPU/HDC 16 to the VCM spindle driver 12 in step 130 and the value of the AD converter having the back electromotive voltage detected by the back-electromotive-voltage detection circuit is read (RerdAD) in step 140 and this value is stored as a plus-side AD value (AD_p=AD). In this case, the relation between DACout and AD value is shown in FIG. 6. The inclination of the linear characteristic in FIG. 6(a) is mainly caused by the temperature change of the resistance value of a VCM coil. An operating point is present on the linear characteristic and moreover, a measurement area for speed is present outside of the linear-characteristic inclination. Therefore, it is better to set the linear-characteristic inclination θ to a value as small as possible in order to obtain a large dynamic range.

In FIG. 5, the CheckAD routine processing (to be described later in FIG. 7) for checking the reading of the AD converter is performed in step 150 and the current value is reversed to the minus side in step 160 (I=−I).

Then, a VCM current whose magnitude is the same as that of the VCM current at the plus side and whose code is changed to the minus side is output (DACout) in step 170 as shown in FIG. 6, the value of the AD converter having a back electromotive voltage is read (RerdAD) in step 180, and this value is stored as a minus-side AD value (AD_m= AD).

Then, the CheckAD routine processing (to be mentioned later in FIG. 7) for checking the reading of the AD converter in step 190 and then, step 200 is started.

The CheckAD processing in the above steps 150 and 190 is a processing for obtaining a dynamic range by properly deciding a saturation level when successively increasing a current while changing codes (polarities) of the current, which is described later in FIG. 7.

In steps 200 to 230, a middle offset serving as an offset is obtained. First, in step 200, it is checked whether a flag offset_done showing that a middle point is obtained is set (offset_done=1?). When the flag offset_done is set, step 240 is started without performing the subsequent processings because the middle point is already obtained.

Figure 6B:
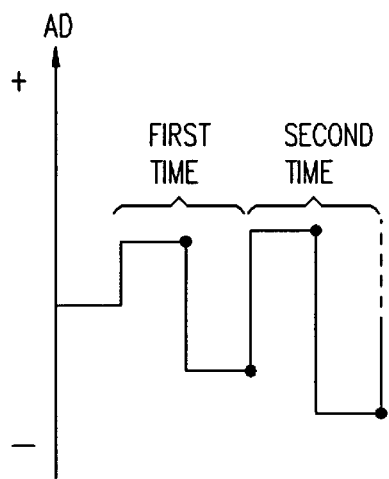

When the flag offset_done is not set, it is judged whether the absolute value |I| of a current is larger than a predetermined value I_offset_val in step 210. When |I| is larger than I_offset_val, it is decided that a middle point can be detected and step 220 is started. That is, as shown in FIGS. 6(a) and 6(b), a current is successively increased while changing codes at the first time, second time, ... to measure the current. When the absolute value |I| of the current exceeds the predetermined value I_offset-val, it is decided that conditions for obtaining a proper offset and inclination are obtained and processings in and after step 220 are started. FIG. 6(a) shows an example of starting measurement with a current I=0. However, it is also possible to more quickly detect an offset and inclination by starting measurement with the current value at the third time shown in FIG. 6(a).

In step 220, a middle offset and an inclination slope are calculated in accordance with the following equations (1) and (2). The middle offset obtained through the above calculation serves as an offset used to control the subsequent loading/unloading speed.

$$\text{offset}=(AD\_p+AD\_m)/2 \quad (1)$$

$$\text{slope}=(AD\_p-AD\_m)/(2\ I) \quad (2)$$

For example, a middle point is obtained when two or three AD converter values are obtained and a value (1) is set to the flag offset_done. It is necessary to obtain the middle point approximately when linearity is assured as early as possible before detecting a saturation level.

Then, a flag set offset_done showing that an offset is obtained is set in step 230 (set offset_done flag=1) to start step 240.

Update AD value processing (to be described later in FIG. 9) for updating an AD value is performed in step 240, polarities of the current I are changed (I=−I) in step 250, the current I is incremented (I=I+I_step) in step 260 in order to process the next current I when a current value is increased, and step 270 is started.

Then, in step 270, it is judged whether the current I exceeds a predetermined maximum value (I>I_max?). When I>I_max, it is decided that an offset and inclination can be measured and this flow is completed. When I≦I_max, step 130 is restarted to repeat the above processing.

FIG. 7 shows a subroutine for executing the CheckAD processing. This flow is interrupt-executed in steps ST15 and ST19 in FIG. 5.

First, it is checked in step 310 whether the flag offset_done showing that a middle point is obtained is set (offset_done=1?). When the flag offset_done is not set, this subroutine is completed without performing the subsequent processings because the middle point is not obtained.

When the flag offset_done is set, the expected value AD_expect of the AD converter to DACout is calculated in step 320 and the error value AD_err of the AD converter is calculated in accordance with the measured value AD and expected value AD_expect of the AD converter in step 330.

Figure 8:
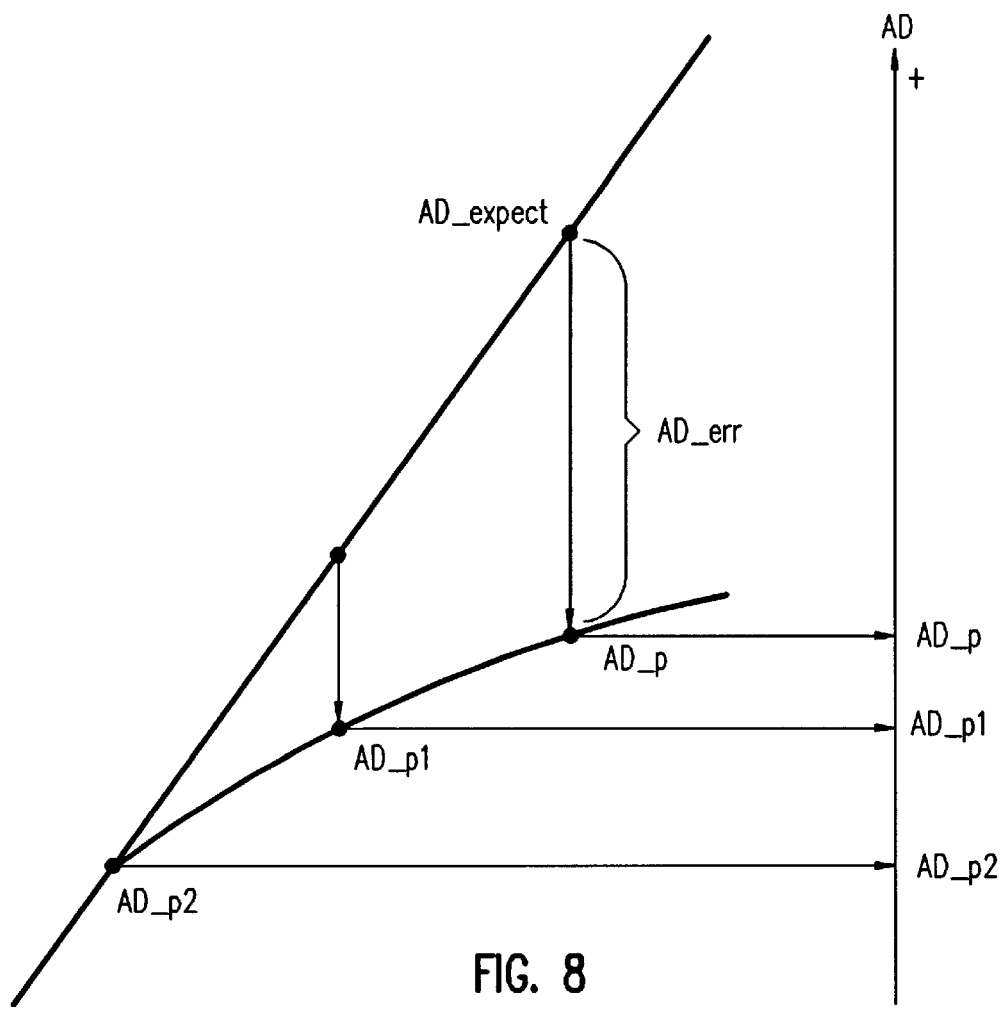
FIG. 8 is an illustration for explaining the CheckAD operation by the disk drive in FIG. 1.

FIG. 8 is an illustration for explaining CheckAD operation, showing a case of obtaining a plus-side saturation level.

In FIG. 8, the linear portion shows the expected value AD_expect of the AD converter and the saturation curve portion shows the measured value AD of the AD converter. FIG. 8 shows a present value AD_p of the AD converter, a value AD_p1 one position before the present value, and a value AD_p2 two positions before the present value. As shown in FIG. 8, AD_err shows the difference value between the expected value AD_expect and the measured value AD of the AD converter obtained through calculation.

In FIG. 7, it is judged in step 330 whether the absolute value of the AD_err exceeds predetermined criteria (|AD_err|>criteria?). When the absolute value of the AD_err exceeds predetermined criteria, it is decided that a predetermined saturation level is reached and it is judged in step 340 whether polarity is plus. Because this subroutine is used for the plus side and the minus side respectively in steps 150 and 190, it is divided into the plus side and the minus side in this step ST34.

When the polarity is plus, the processing of this flow is completed in step 350 by using the value AD_p2 two positions before the present value AD_p as a saturation point (AD_sat_p=AD_p2). When the polarity is minus, the processing of this flow is completed in step 360 by using the value AD_m2 two positions before the present value AD_m as a saturation point (AD_sat_m=AD_m2).

Thus, a past value two positions before the present value when the absolute value of AD_err exceeds predetermined criteria is set as the saturation point of a dynamic range. For example, if the absolute value exceeds the criteria at the point of time of AD_p shown in FIG. 8, the value AD_p2 two positions before the present value is set as a saturation point. That is, when the absolute value of AD_err exceeds criteria, a nonlinear state actually appears slightly before the time when the absolute value exceeds the criteria. Therefore, past history is stored to use, for example, a value two positions before the present value. This embodiment uses a value two positions before the present value. However, it is also possible to use a proper past value correspondingly to a criteria setting condition or a sampling interval.

FIG. 9 is a subroutine for executing the above Update AD value processing and this flow is executed in step 240 in FIG. 5.

In step 410, the value AD_p1 one position before the plus-side AD converter is updated to the value AD_p2 two positions before the AD converter and the present value AD_p is updated to the value AD_p1 one position before the AD converter, and then the value AD_m1 one position before the minus-side AD converter is updated to the value AD_m2 two positions before the AD converter and the present value AD_m is updated to the value AD_m1 one position before the AD converter, and this flow is completed.

As described above, the disk drive 10 of the first embodiment comprises a VCM spindle driver 12 for rotating a disk 11, a magnetic head 13, an actuator mechanism 14 for moving a head slider having the magnetic head 13 to a position above the surface of the disk 11 and an unloaded position, a ramp block 15, and a CPU/HDC 16 for performing speed control of an actuator and calibration control for detecting the offset and dynamic range of an AD converter before the speed control and controlling the operation for reading or writing data from or into the disk 11 so as to increase a rectangular current value to be applied to a voice coil while successively changing codes, measure an offset in accordance with the AD converter value for each current value, measure the dynamic range by judging a nonlinear area when the difference between the expected value and measured value of the AD converter becomes a predetermined value or more, and moreover in this case, a stored past value is used. Therefore, it is possible to detect an effective linear operation range and improve the reliability of data by performing stable speed control.

Thus, it is possible to avoid a current exceeding a linear range from being applied and securely prevent a disk from damaging due to an unexpected control error or user data from being lost.

Figure 10:
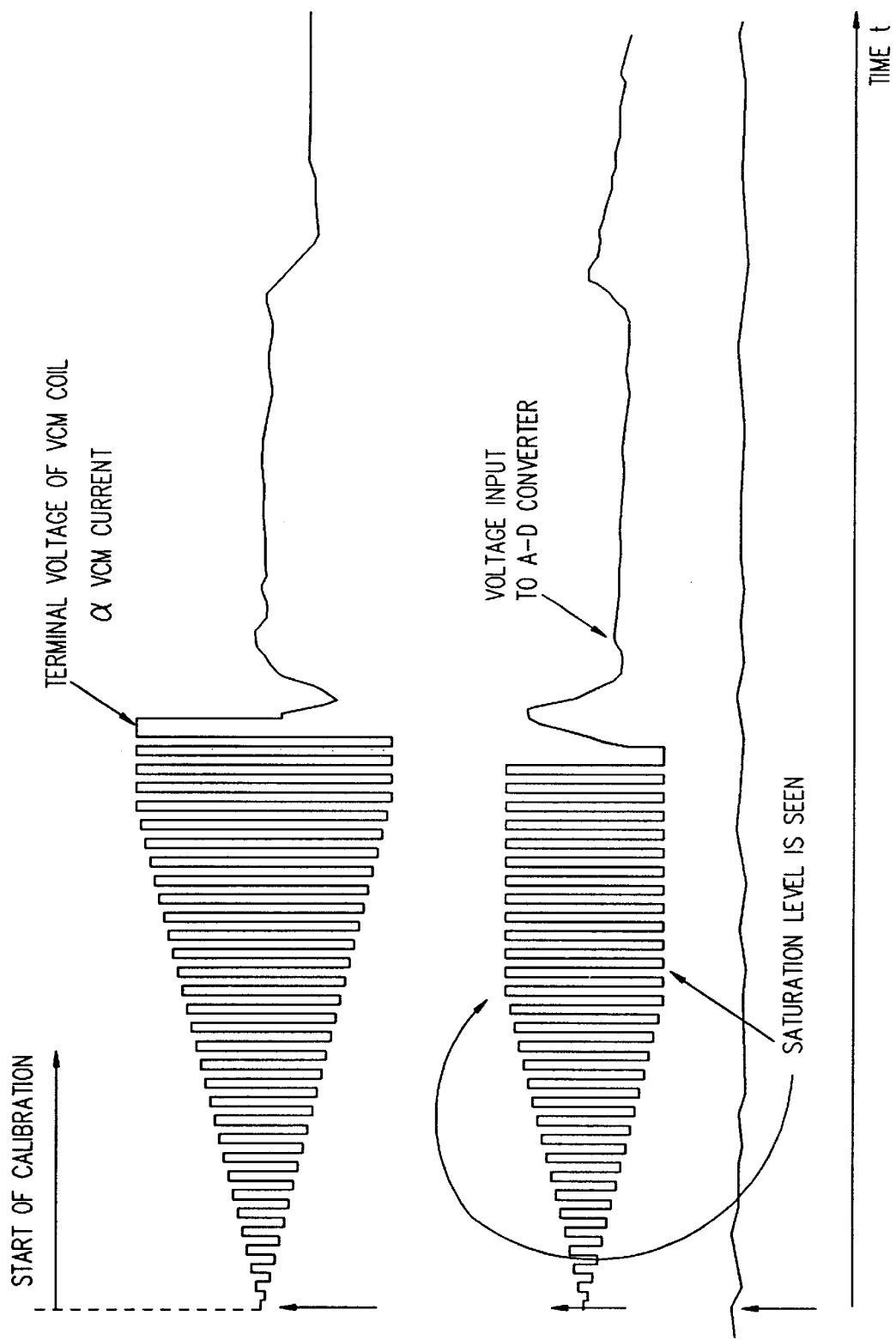
FIG. 10 is an illustration showing an experimental example of calibration control applied onto an actual HDD of the disk drive in FIG. 1.

FIG. 10 is an illustration showing an experimental example of the calibration control applied onto an actual HDD, showing the relation between VCM current of calibration under loading and reading of AD converter.

As shown in FIG. 10, it is possible to detect a dynamic range which is an effective linear range of hardware and improve the reliability by performing stable speed control in accordance with the dynamic range.

Moreover, because this embodiment uses a value two positions before when the absolute value of the difference between the expected value and measured value of the AD converter exceeds criteria, it is possible to securely use a value in a linear range and further improve the reliability.

Furthermore, by executing the calibration control every time before starting loading/unloading control and actuator speed control, it is possible to perform optimum control corresponding to the then operating state of hardware.

This embodiment uses a past value two positions before by judging a nonlinear area when the difference between the expected value and measured value of the AD converter becomes predetermined criteria or more. However, it is also possible to use a proper value correspondingly to a criteria setting condition or a sampling interval.

Moreover, this embodiment measures an offset and a dynamic range in accordance with the value of the AD converter for each current value. However, it is needless to say that a mode for measuring either of the offset and dynamic range can be used. Furthermore, this embodiment obtains an offset when two or three AD converter values are obtained. However, it is also possible to obtain the offset after measuring the dynamic range.

A dynamic range and an offset can be obtained through the calibration control by the first embodiment and the reliability of loading/unloading control can be greatly improved by using the calibration result. Because the first embodiment performs the calibration control when an actuator is present at the unloaded position of a ramp block, it does not obtain an offset under unloading when the actuator is not present on the ramp block. However, to improve the reliability of unloading control, the offset under unloading is also necessary. Therefore, a method for detecting an offset under unloading is described in the second embodiment.

Second Embodiment:

The disk drive of the second embodiment can be applied to a small HDD having a loading/unloading mechanism.

Figure 11:
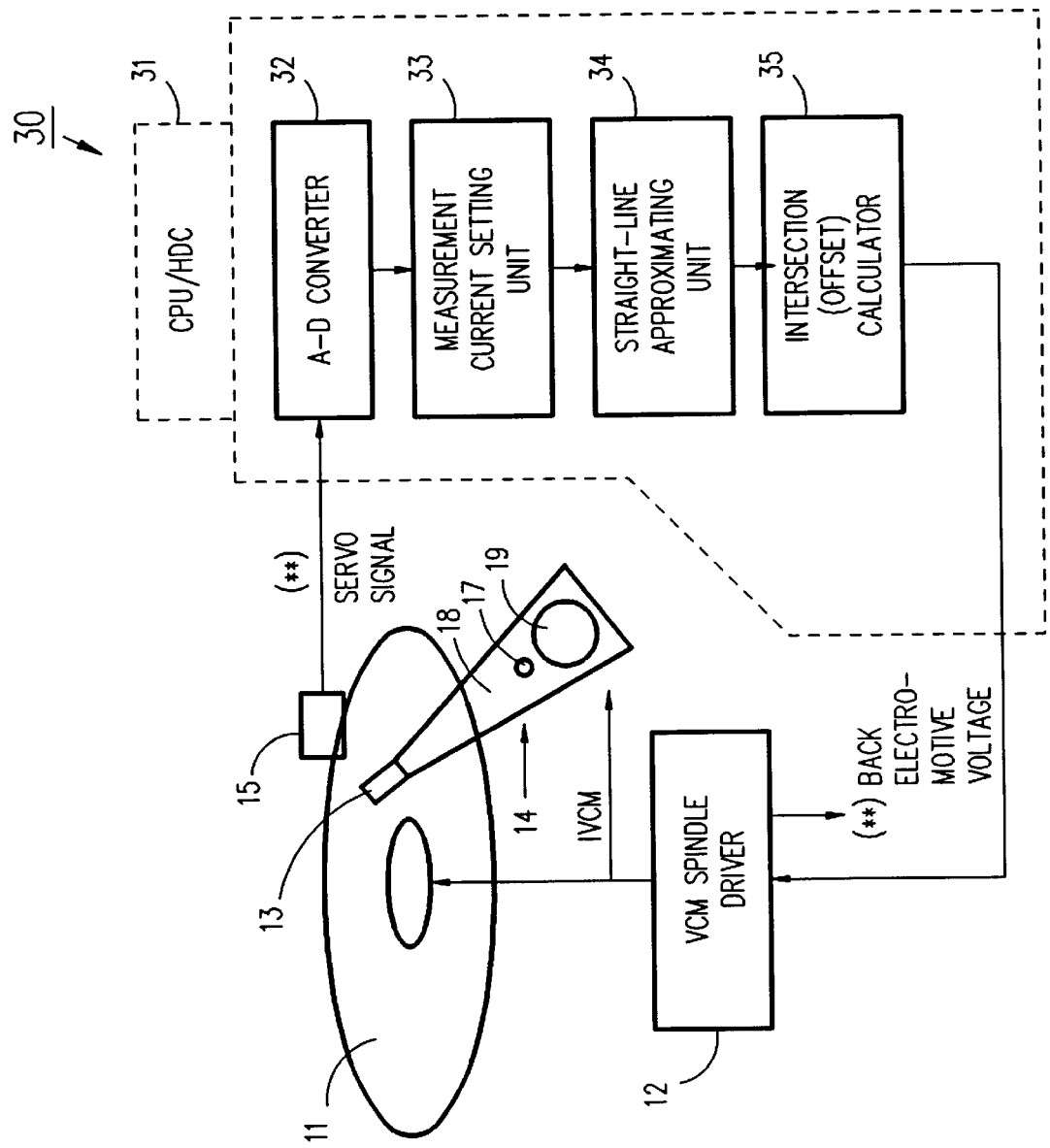
FIG. 11 is a block diagram showing the structure of the disk drive of the second embodiment of the present invention.

FIG. 11 is a block diagram showing the structure of the disk drive of the second embodiment of the present invention. To describe the disk drive of this embodiment, a component same as that of the disk drive shown in FIG. 1 is provided with the same symbol but the description of a duplicated portion is omitted.

In FIG. 11, a disk drive 30 comprises a disk 11 such as a magnetic disk serving as a data recording medium, a VCM spindle driver 12 including a spindle motor for rotating the disk 11, a magnetic head 13 for reading or writing data from or into the disk 11, an actuator mechanism 14 for moving a head slider having the magnetic head 13 to a position above the surface of the magnetic disk 11 and an unloaded position, a ramp block 15, and a CPU/hard disk controller (HDC) 31 for performing the speed control of an actuator and the calibration control for detecting an offset value before the speed control and controlling the operation for reading or writing data from or into the disk 11. The disk drive is provided with a head loading/unloading mechanism, which loads the head slider to a position above the surface of the disk 11 at the start of operation and unloads the head slider from the position above the surface of the disk 11 to the unloaded position at the stop of operation.

When the head slider having the magnetic disk 13 is present at a position above the surface of the magnetic disk 11, a signal showing a head position is input to the CPU/HDC 31. Moreover, when performing the loading/unloading control of the head slider, a back electromotive voltage (**) detected by a back-electromotive-voltage detection circuit in the VCM spindle driver 12 is input to the CPU/HDC 31.

The CPU/HDC 31 is constituted by forming a CPU for performing the speed control of the actuator and the calibration control for detecting the value of an AD converter (i.e. offset value) when a current is zero before the speed control, an HDC for controlling the operation for reading or writing data from or into the disk 11, an amplifying circuit for amplifying a position detection signal or a detection signal for the back electromotive voltage, a waveform shaping circuit, an analog-to-digital converter (AD converter), and a digital-to-analog converter (DAC) into a module.

Particularly, the CPU/HDC 31 has an AD converter 32, a measurement current value setting unit 33, a straight-line approximating unit 34, and an intersection (offset) calculator 35 as circuit sections for performing the calibration control. These circuit sections can be constituted by hardware including an electronic circuit. In the case of this embodiment, however, they are realized by software through the arithmetic processing by a CPU.

Moreover, the CPU/HDC 31 supplies a driving current to a voice coil 19 of the actuator mechanism 14, rotate an arm 18, and unloads the head slider from a position above the surface of the disk 11 to an unloaded position when the disk drive 30 stops its operation. Furthermore, when the disk drive 30 starts its operation, the CPU/HDC 31 rotates the arm 18 and loads the head slider to a position above the surface of the disk 11 starting rotation. Furthermore, the CPU/HDC 31 moves the head slider onto a desired data area in accordance with the servo data read by the magnetic head 13 of the head slider. FIG. 11 shows a state in which a head slider is present on the disk 11.

Operations of the disk drive 30 having the above structure are described below. First, the basic concept of the present invention is described.

In the case of a disk drive having a mechanism for loading or unloading an actuator onto or from a ramp, when detecting a back electromotive voltage generated at the both ends of a VCM coil with a back-electromotive-voltage detection circuit, inputting the detected back electromotive voltage to a CPU through an AD converter, and controlling the speed of the actuator by using the detected back electromotive voltage as a control object, the value of the AD converter when a control current is zero, that is, an offset value is necessary in order to calculate a back electromotive voltage component.

Figure 12:
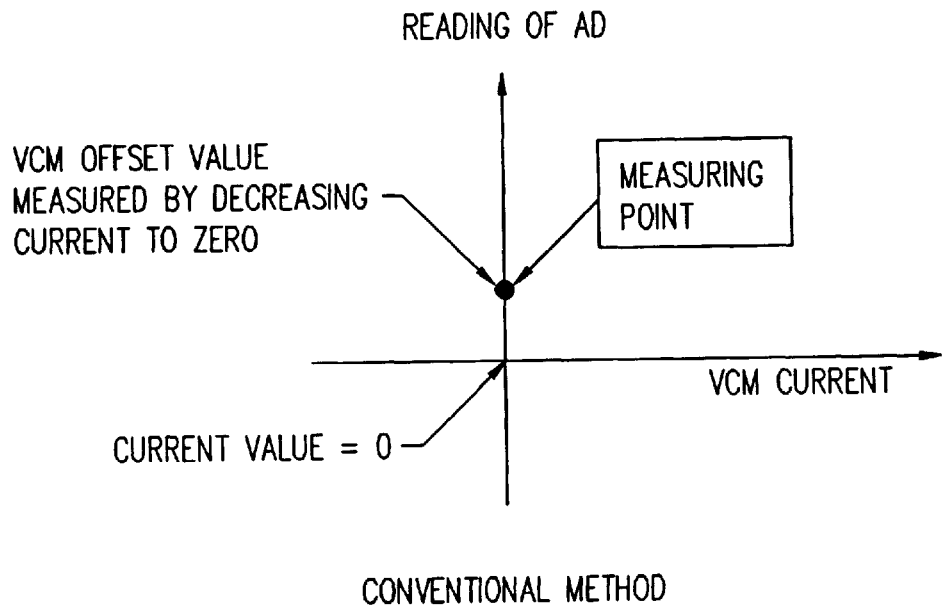
FIG. 12 is an illustration showing a conventional method for explaining the offset measurement operation by the disk drive in FIG. 11.

FIG. 12 is an illustration for explaining a conventional offset detection method. As shown in FIG. 12, in the case of the conventional offset detection method, a current is actually decreased to zero and the then value of an AD converter is handled as an offset value.

However, because the current is zero, no force is applied to an actuator. Therefore, if there is a disturbance in the rotational direction during the above period, the actuator easily moves while an offset value is measured. Then, a back electromotive voltage is generated because a coil crosses the electrical field of a VCM and this influences the measurement by an AD converter and thus, no accurate offset value is obtained. Moreover, when a disk drive is used as the disk drive of a notebook-type computer, the power supply voltage supplied to the disk drive may fluctuate (particularly lower). When an operational amplifier of a back-electromotive-voltage detection circuit for detecting a back electromotive voltage has voltage dependency, offset values change and it is impossible to detect an accurate back electromotive voltage.

If speed control is started when no accurate offset value is obtained, control is performed by using the difference from an offset value as the present speed. Therefore, no correct target can be set and thereby, a head cannot be loaded onto a disk at a safe speed. Thereby, the possibility that the disk is damaged rises and moreover, the reliability of data is influenced. Because of the same reason, a trouble occurs that a lot of unloading time is required for unloading.

Therefore, the present invention presses an actuator against the inner (INNER) side or outer (OUTER) side by flowing a proper bias current so that the actuator does not easily move under measurement to measure bias currents value and calculates an offset in accordance with a plurality of measured bias current values.

Figure 13:
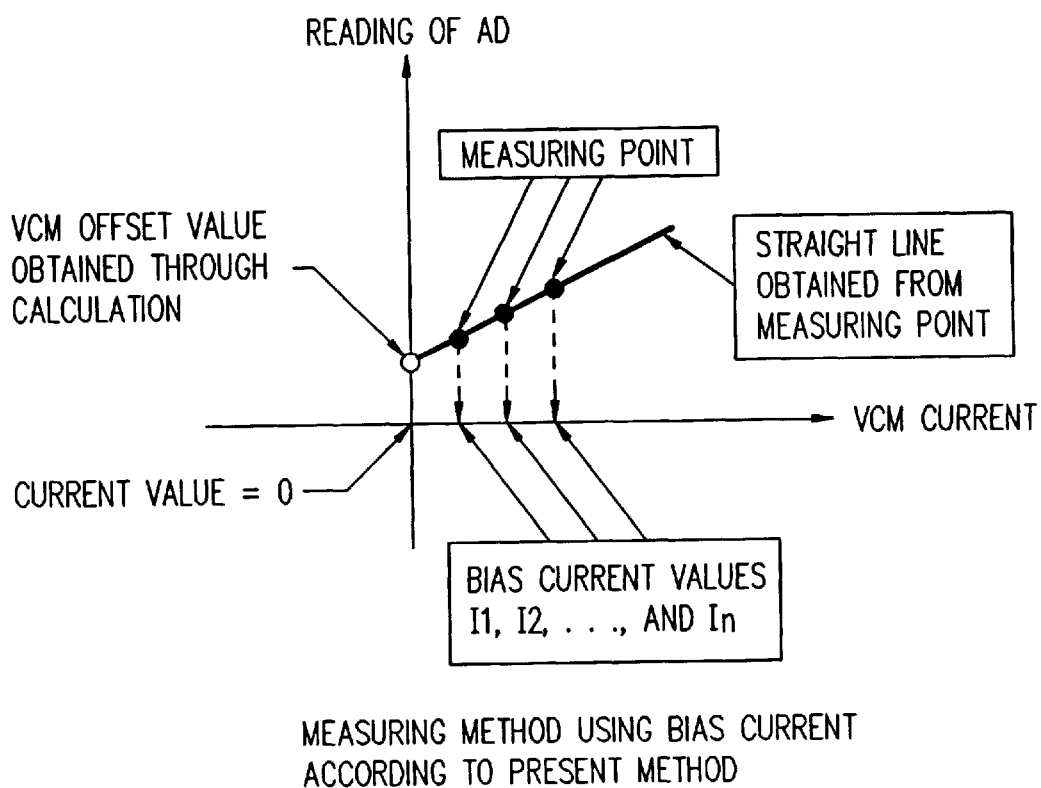
FIG. 13 is an illustration for explaining the offset measurement operation by the disk drive in FIG. 11.

FIG. 13 is an illustration for explaining an offset detection method using a bias current according to the method of the present invention.

As shown in FIG. 13, a plurality of n (n is a natural number) proper bias currents are supplied to the opposite direction to the loading or unloading side such as the outer side under loading or inner side under unloading for a certain period to measure the value of each AD converter. In this case, because an actuator is pressed against the inner side or outer side, it is not influenced by disturbance such as vibration.

Moreover, a primary-interpolated straight line is obtained in accordance with measured values to calculate the value of an AD converter when a current is zero.

Then, operations of the disk drive 30 are described below in detail in accordance with the above basic concept.

Figure 14:
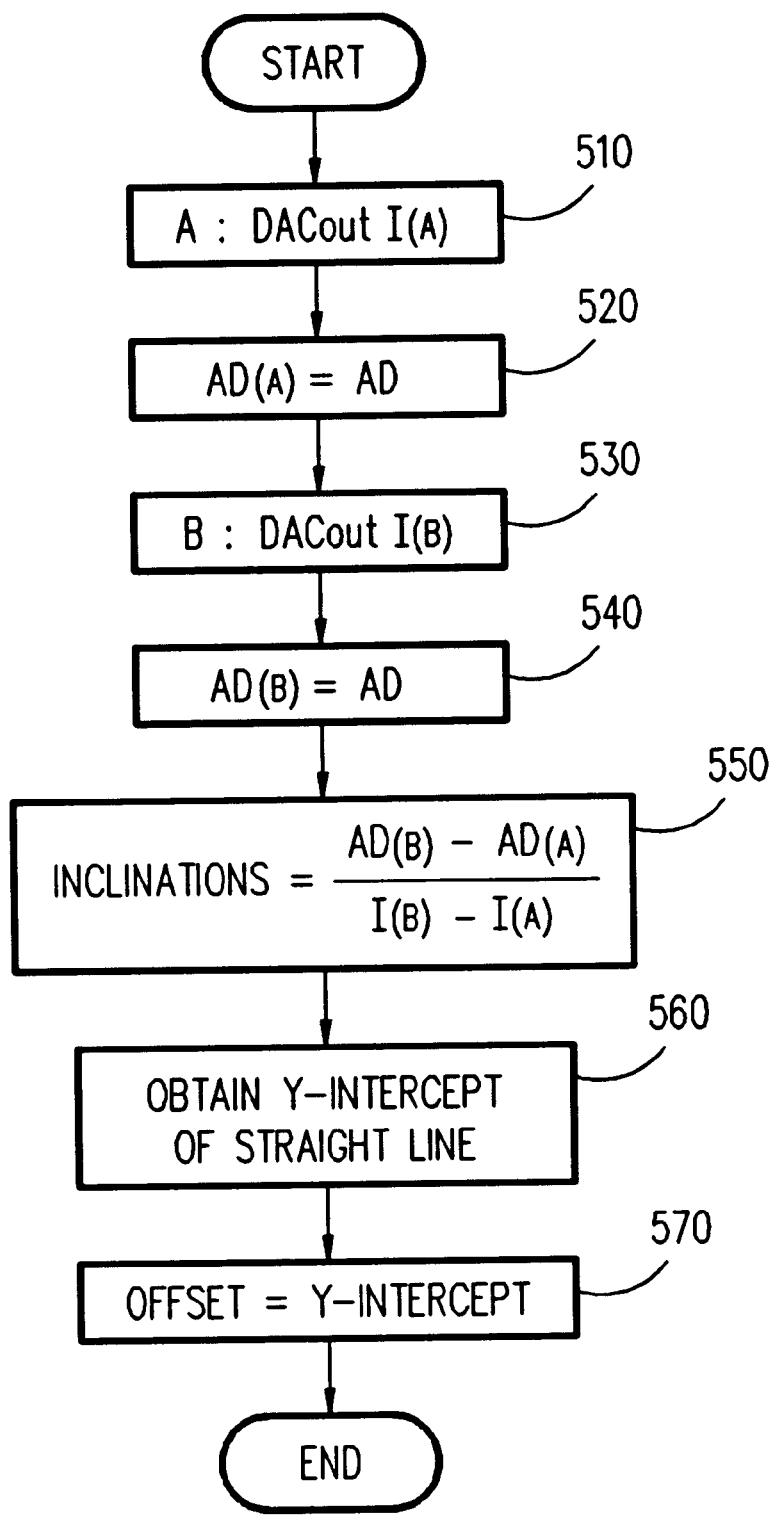
FIG. 14 is a flow chart showing the offset measurement by the disk drive in FIG. 11.

FIG. 14 is a flow chart showing the above operation for offset measurement.

This flow is executed by the CPU/HDC 31 every time before loading or unloading control.

In this case, when a power supply is turned on and a head is not present on a disk (that is, when the servo information showing a head position on the disk can be read), an actuator is retreated up to the outermost track and thereafter, this flow starts. Moreover, to perform unloading control when the head is present on the disk (that is, when the servo information showing a head position on the disk can be read), the actuator is temporarily moved up to the innermost track and thereafter, this flow starts.

Figure 15:
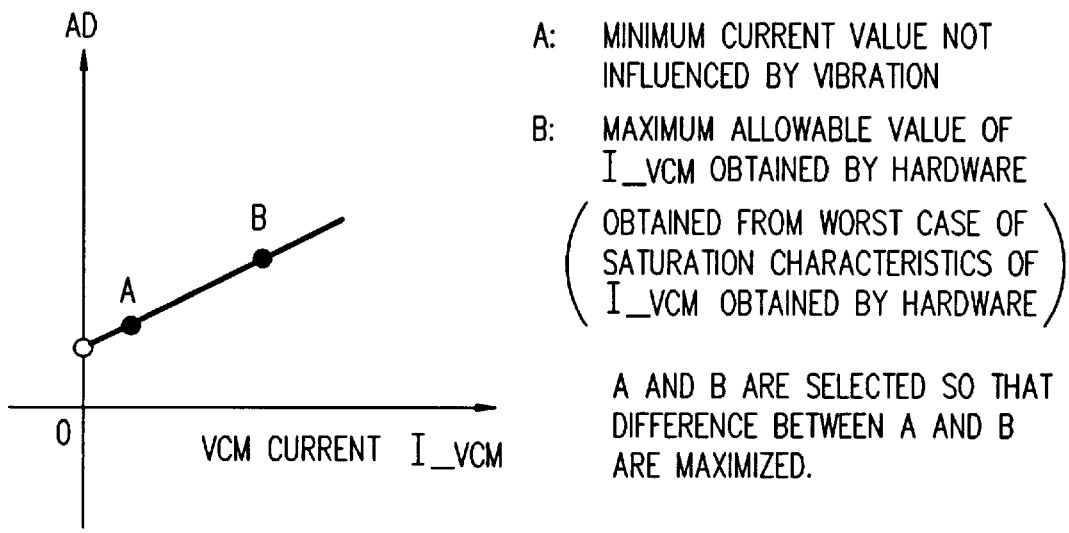
FIG. 15 is an illustration for explaining the offset measurement operation by the disk drive in FIG. 11.

When a loading/unloading command is issued, a program starts, the VCM current (second current) at the point A in FIG. 15 is output {DACout I(A)} to the VCM spindle driver from the CPU/HDC 31 in step 510, the value of the AD converter is read in step 520, and the value is stored as an AD value at the point A.

Then, the VCM current (first current) at the point B in FIG. 15 is output {DACout I(B)} in step 520, the value of the AD converter is read in step 520, and the value is stored as an AD value at the point B.

A proper value is set to the above two bias current values A and B from the following point of view. The bias current value A is set to a minimum current value so that it is not influenced by vibration. Moreover, the bias current value B is set to a maximum allowable value of a VCM current I_vcm obtained through hardware. Specifically, the bias current B is obtained through calculation in accordance with the I_vcm and the worst case of the saturation characteristic of the AD converter. For example, a current value for assuring the worst value is previously set by considering voltage fluctuation within a saturation point through an experiment or the like. Moreover, it is possible to use a mode for setting the bias current B in accordance with the dynamic range obtained for the first embodiment. Furthermore, a value for maximizing the difference between the bias current values A and B is selected in order to improve the accuracy of the primary interpolation of a straight line.

In FIG. 14, the inclination S of a primary-interpolated straight line is calculated in accordance with the AD value measured by the two bias current values A and B in step 550 to obtain the y-intercept of the straight line in step 560.

Then in step 570, the y-intercept obtained is stored as the value of the AD converter when a current is zero, that is, the offset and this flow is completed.

As described above, the disk drive 30 of the second embodiment is constituted so as to supply a first current having an optimum value within a dynamic range and a second current having a minimum value for supplying a force to an actuator so that it is not influenced by voltage fluctuation of a back-electromotive-voltage detection circuit and an actuator is not influenced by vibration from the outside to a voice coil and measure the value of an AD converter when an applied current is zero as an offset by means of primary interpolation in accordance with the AD converter value for each current value. Therefore, even if there is a disturbance such as vibration or voltage fluctuation, it is possible to detect an accurate offset value, improve the reliability of loading or unloading a head, and moreover improve the reliability of data.

That is, in the case of a conventional example, because an offset is detected while no force is applied to an actuator, the actuator is moved due to disturbance and thereby, an accurate offset value may not be obtained. Moreover, when a supplied power-supply voltage is lowered, it may not be possible to detect an accurate offset. Therefore, troubles occur that a head cannot be loaded on a disk at a safe speed, the reliability of data is influenced, and a lot of unloading time is required for unloading. In the case of this embodiment, however, it is possible to detect an accurate offset value even if there is a disturbance such as vibration or voltage fluctuation.

Moreover, in the case of this embodiment, when the actuator is not present at the unloaded position of the ramp block, it is possible to easily obtain an offset even under, for example, unloading.

Furthermore, this embodiment calculates an offset through the primary interpolation in accordance with an AD value measured by two bias current values A and B. However, it is needless to say that any current-value setting method, any number of measured current values, and any interpolation method can be used as long as an offset can be obtained through the primary interpolation in accordance with the AD converter value for each current value by supplying a plurality of currents to a voice coil.

Third Embodiment:

The disk drive of the third embodiment can be applied to a small HDD having a loading/unloading mechanism.

Figure 16:
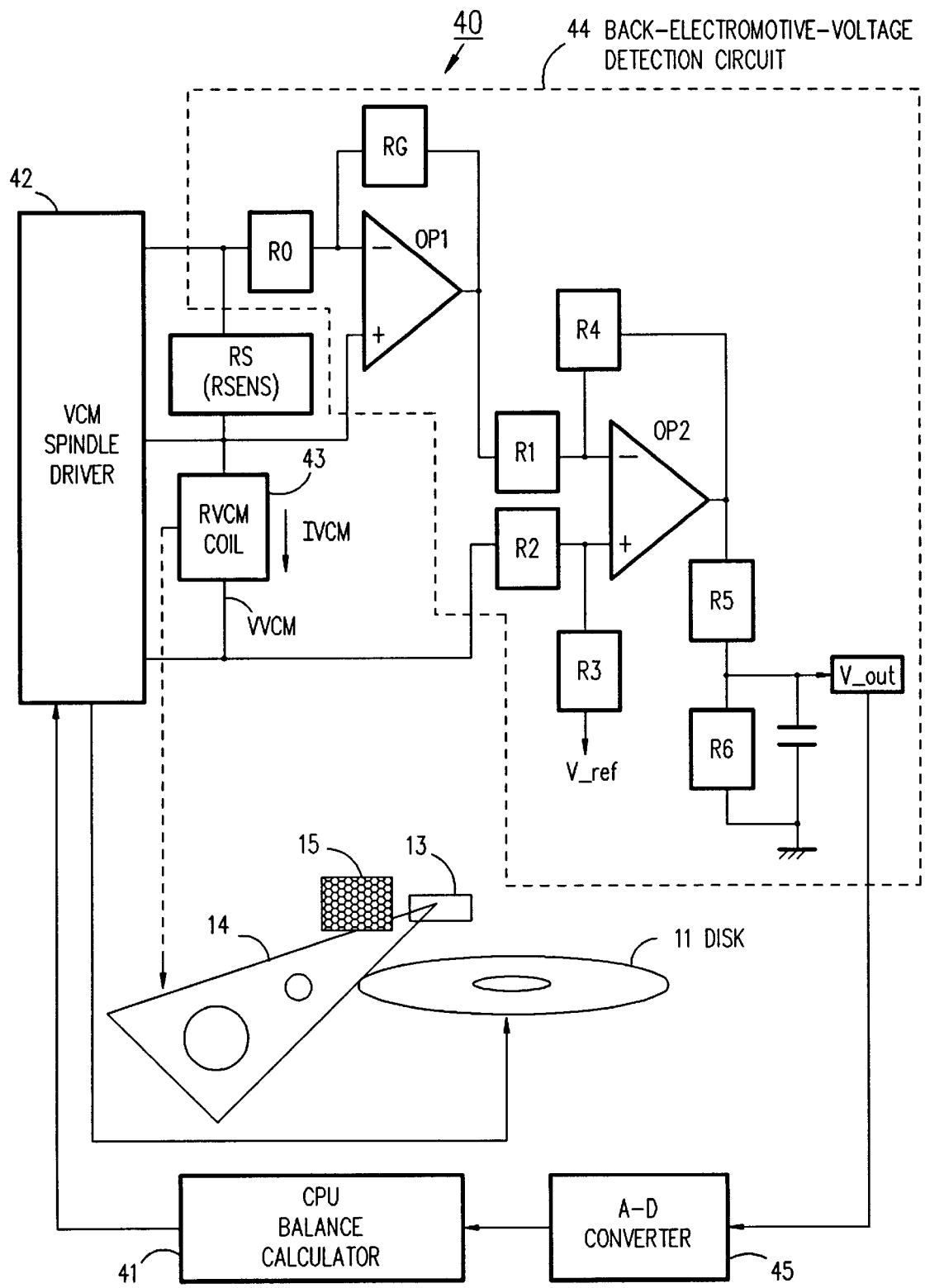
FIG. 16 is a block diagram showing the structure of the disk drive of the third embodiment of the present invention.

FIG. 16 is a block diagram showing the structure of the disk drive of the third embodiment of the present invention. To describe the disk drive of this embodiment, a component same as that of the disk drive shown in FIG. 1 is provided with the same symbol and the description of a duplicated portion is omitted.

In FIG. 16, a disk drive 40 includes a disk 11 such as a magnetic disk serving as a data recording medium, a magnetic head 13 for reading or writing data from or into the disk 11, an actuator mechanism 14 for moving a head slider having the magnetic head 13 to a position above the surface of the disk 11 and an unloaded position, a ramp block 15, a CPU 41 for performing calibration control and controlling operations of an actuator, and a spindle motor for rotating the disk 11 and moreover, comprises a VCM spindle driver 42 for driving a VCM in accordance with a VCM current supplied from the CPU 41, a VCM coil 43 to be turned on by the VCM spindle driver 42, a back-electromotive-voltage detection circuit 44 for detecting a back electromotive voltage generated in the VCM coil 43, and an AD converter 45 for converting an output V_out of the back-electromotive-voltage detection circuit 44 into a digital signal.

The CPU 41 functions as a balance calculator for performing calibration control. The circuit section of the CPU 41 can be constituted by hardware such as an electronic circuit. In the case of this embodiment, however, the circuit section is realized by software through the arithmetic processing by the CPU.

The back-electromotive-voltage detection circuit 44 comprises an operational amplifiers OP1 and OP2, balance resistances R0 and Rg, resistances R1 to R6, and an output terminal V_out.

When assuming the resistance of the VCM coil 43 as R_vcm and the output-terminal resistance of the VCM driver 42 connected in series with the R_vcm as Rsens (displayed as Rs in an equation), the operational amplifier OP1 and the resistances R_vcm, Rs, R0, and Rg constitute a bridge circuit as a whole. When the bridge circuit is under an equilibrium state, a voltage V_vcm generated in the VCM coil 43 is equal to the output of the operational amplifier OP1. That is, the voltage V_vcm generated in the VCM coil 43 can be fetched as an output of the operational amplifier OP1.

The operational amplifier OP2, resistances R1 to R6, and output terminal V_out constitute a differential amplifier for outputting the output of the operational amplifier OP1 as a back electromotive voltage.

The structure of the back-electromotive-voltage detection circuit 44 is described below.

In FIG. 16, for a back electromotive voltage V_bemf generated in the VCM coil 43, the output V_out is shown by the following equation (3) or (4) because $R5/(R5+R6)=\frac{1}{2}$ when assuming that the resistance R5 equals R6.

$$V\_out=(\tfrac{1}{2})\,(R4/R1)\,(I\_vcm\,Rs\,Rg/R0-V\_vcm)+V\_ref/2=(\tfrac{1}{2})\,(R4/R1)\,(I\_vcm\,(Rs\,Rg/R0-R\_vcm)+V\_bemf)+V\_ref/2 \quad (3)$$

$$=A(I\_vcm\,dR+V\_bemf)+B \quad (4)$$

Where $$A=(\tfrac{1}{2})\,(R4/R1) \quad (5)$$

$$dR=Rs\,Rg/R0-R\_vcm \quad (6)$$

$$B=V\_ref/2$$

The maximum current I_vcm to be supplied to the VCM coil is shown by the following equation (7) in accordance with the above equation (4). As understood from the equation (7), I_vcm is inversely proportional to the above dR.

$$I\_vcm=(1/dR)\,((V\_out-B)/A-V\_bemf) \quad (7)$$

Because the above V_out is input to the AD converter 45 of the CPU 41, the current proportional term I_vcm dR in the equation (4) can be a factor exceeding the measurement range of the AD converter 45. That is, as shown by the equation (7), the maximum value of I_vcm is further limited as dR increases.

Under a balanced state {case in which equation (9) to be mentioned later is satisfied), dR equals 0. However, R_vcm easily changes by supplying a current. Therefore, on the contrary, it is better to set a state (temperature t1) after supplying a current to a certain extent so that dR becomes equal to 0. That is, when assuming that the temperature when turning on a power supply in a cold district or under a low-temperature environment is t0 and the temperature when almost balanced is t1, it is necessary to adjust the intensity of the VCM current and the time for supplying the VCM current so as to meet the following equation (8).

$$dR\,(t0)>dR\,(t1)\,(\neq \text{nearly zero}) \quad (8)$$

Operations of the disk drive 40 having the above structure are described below. However, the basic concept of the present invention is first described.

A hard disk drive having a mechanism for loading or unloading a head onto or from a ramp detects a back electromotive voltage generated at the both ends of the VCM coil 43 with the back-electromotive-voltage detection circuit 44, inputs the detected back electromotive voltage to the CPU 41 through the AD converter 45, and performs the speed control of an actuator by using the detected back electromotive voltage as a control object.

In this case, it is necessary to accurately measure the back electromotive voltage in order to correctly control the actuator. Therefore, before starting the speed control for loading a head onto a disk, it is necessary to measure the degree of the balance between the resistance value of the VCM coil 43 and the balance resistances R0 and Rg of the back-electromotive-voltage detection circuit 44 set on a card. The balance related equation is shown by the following equation (9).

$$Rvcm/Rsens=Rg/R0 \quad (9)$$

In the case of this type of hardware, a maximum amount of current to be supplied to the VCM coil 43 is determined in accordance with the degree of the balance shown by the equation (9). That is, as the balance shown by the equation (9) collapses, the maximum current to be applied to the VCM coil 43 is further limited.

The resistance value R_vcm of the VCM coil 43 is generated by a long wire-wound resistor and easily subject to temperature change and moreover, it easily changes when a current flows. Therefore, the balance shown by the equation (9) easily collapses.

In the case of a conventional method, a resistance value under the balanced state shown by the equation (9) at ordinary temperature is set to the balance resistance Rg. Therefore, a maximum current is limited due to the collapse of the balance when coil temperature rises. For example, the inclination characteristic of the linear area shown in FIG. 2 is mainly caused by the change of the coil temperature. As the coil temperature rises and the balance collapses, the inclination further increases. Resultingly, the maximum current is limited due to decrease of a dynamic range.

Therefore, when the maximum current is limited, a sufficient amount of current against the friction of a ramp cannot be obtained and thereby, an unstable factor is added to the speed control of a disk by a head. Particularly, because temperature is low such as the time when a power supply is turned on in a cold district, a coil resistance value greatly lowers and thus, the above balance greatly collapses and the maximum current is greatly limited. This can be the cause of a fatal error that a head cannot be loaded onto a disk from a ramp under the loading or unloading operation, that is, data cannot be read.

Therefore, in the case of the present invention, hardware is set so as to bring a balance point meeting the above equation (9) to a position where a VCM coil has ordinary temperature or a temperature slightly higher than ordinary temperature. For example, in FIG. 16, it is necessary to select the balance resistance Rg. This is described below more minutely by referring to FIG. 17.

Figure 17:
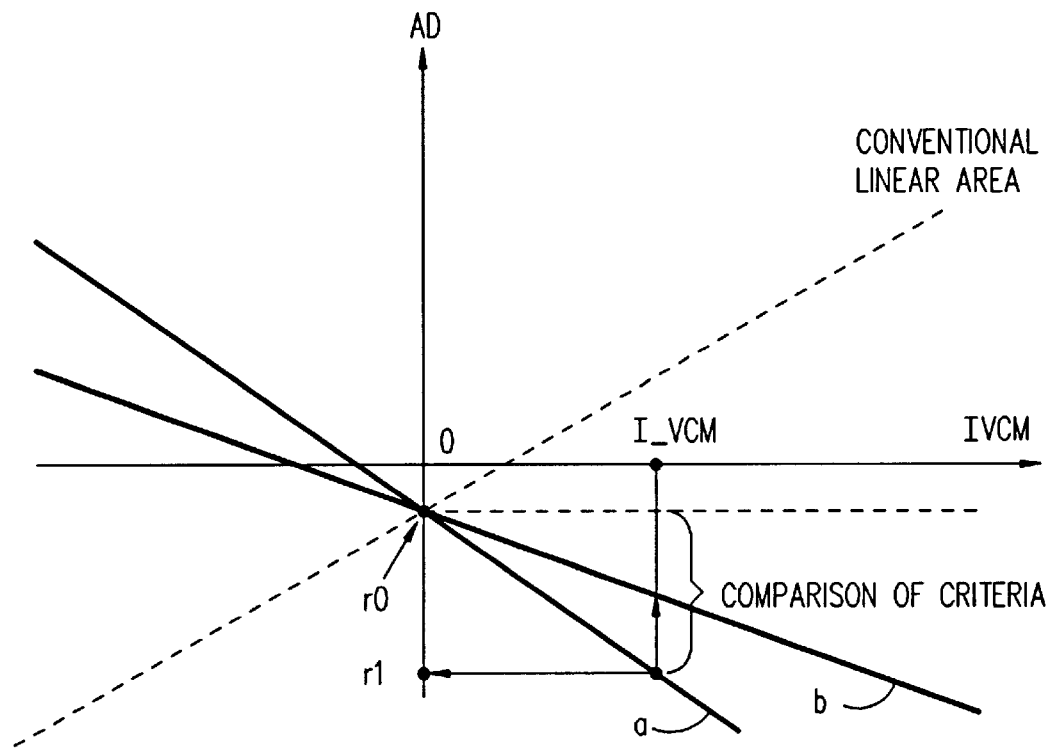
FIG. 17 is a characteristic diagram showing the relation between the VCM current and the AD converter value of the disk drive in FIG. 16.

FIG. 17 is a characteristic diagram showing the relation between VCM current and AD converter value. In the case of a conventional method, a resistance value under a state in which the balance shown by the equation (9) is kept at ordinary temperature is set to the balance resistance Rg and the characteristic shown by the broken line in FIG. 17 is obtained. When the coil temperature rises, the inclination of the linear area shown by the broken line in FIG. 17 increases in the plus direction.

In the case of the present invention, the value of the balance resistance Rg is set so as to bring a balance point meeting the equation (9) to a position where the temperature of a VCM coil is close to ordinary temperature. Thereby, as shown by symbol "a" in FIG. 17, the linear area has a minus inclination when the temperature of the VCM coil is low such as the time when a power supply is turned on, the inclination decreases as the temperature of the VCM coil rises, and the inclination becomes almost zero at a position where the temperature of the VCM coil is closet to ordinary temperature. Therefore, it is possible to maximize a dynamic range at ordinary temperature and increase a maximum allowable amount of current to be supplied to the VCM coil.

Moreover, the present invention has a function for checking the degree of balance before loading and supplying a proper current (this current is set in accordance with the function of, for example, time, present temperature, temperature rise rate, and target balance value) to the VCM coil. Thereby, under loading or unloading in a low-temperature environment (e.g. when a power supply is turned on in a cold district or in the morning in winter), a VCM coil is warmed by supplying a current to the VCM coil and the balance with the balance resistances Rg and R0 of the back-electromotive-voltage detection circuit 44 is improved by changing resistance values of the coil and thereafter, the speed control of an actuator can be started.

Then, operations of the disk drive 40 are described below in detail in accordance with the above basic concept.

Figure 18:
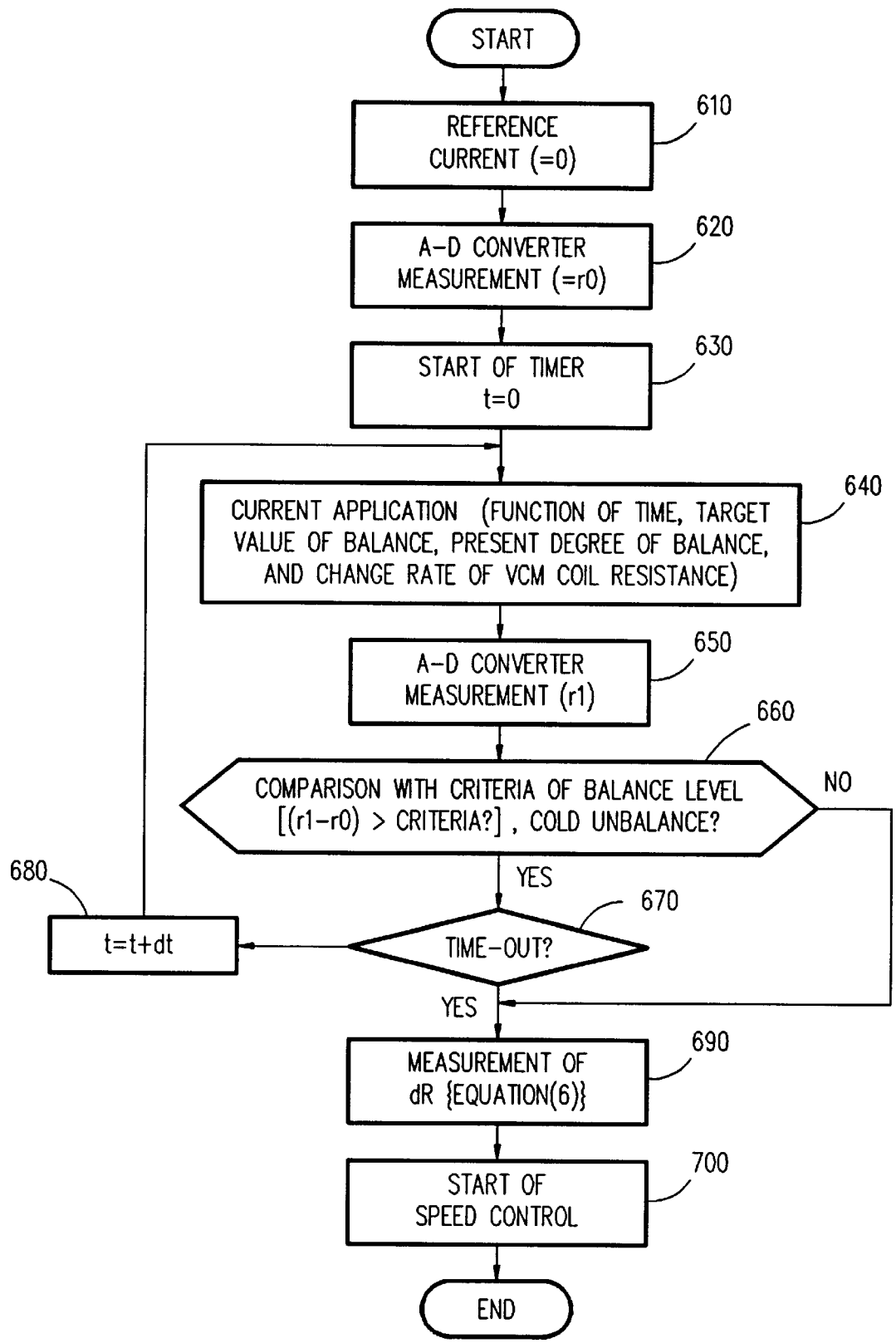
FIG. 18 is a flow chart showing the warm-up calibration control operation by the disk drive in FIG. 16.

FIG. 18 is a flow chart showing the above warm-up calibration control operation.

This flow is executed when a power supply is turned on by the CPU 41 before the loading/unloading control.

First, a reference current is set to zero (I_vcm=0) in step 610 and the reading of an AD converter is measured in step 620. Thereby, an offset value offset_val is obtained. In this flow and FIG. 17, measured offset is assumed as r0. In this case, it is also possible to obtain the offset by the method of the first or second embodiment described above.

Then, a timer for heating up is started in step 630 and a heating-up VCM current I_vcm is applied in step 640.

Figure 19:
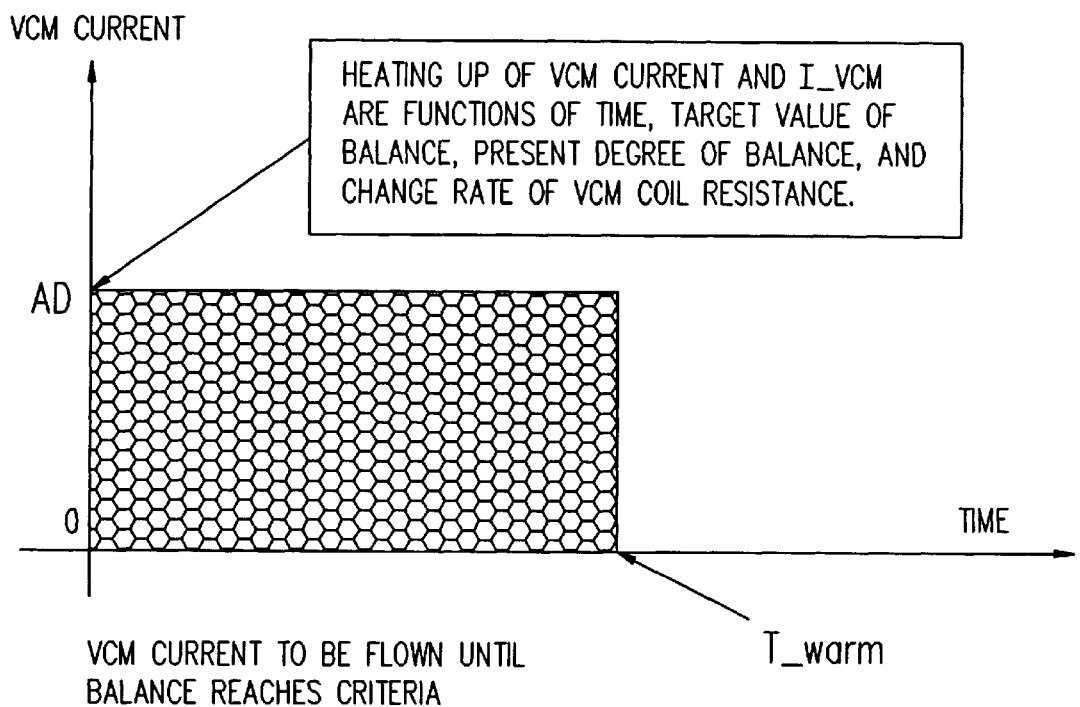
FIG. 19 is an illustration showing the heating-up VCM current to be flown until the balance of the disk drive in FIG. 16 reaches criteria.

FIG. 19 is an illustration showing a heating-up VCM current to be supplied until balance reaches criteria. In FIG. 19, the heating-up VCM current I_vcm is set to a proper value in accordance with the function of time, target value of balance, degree of present valance, and change rate of VCM coil resistance.

Figure 20:
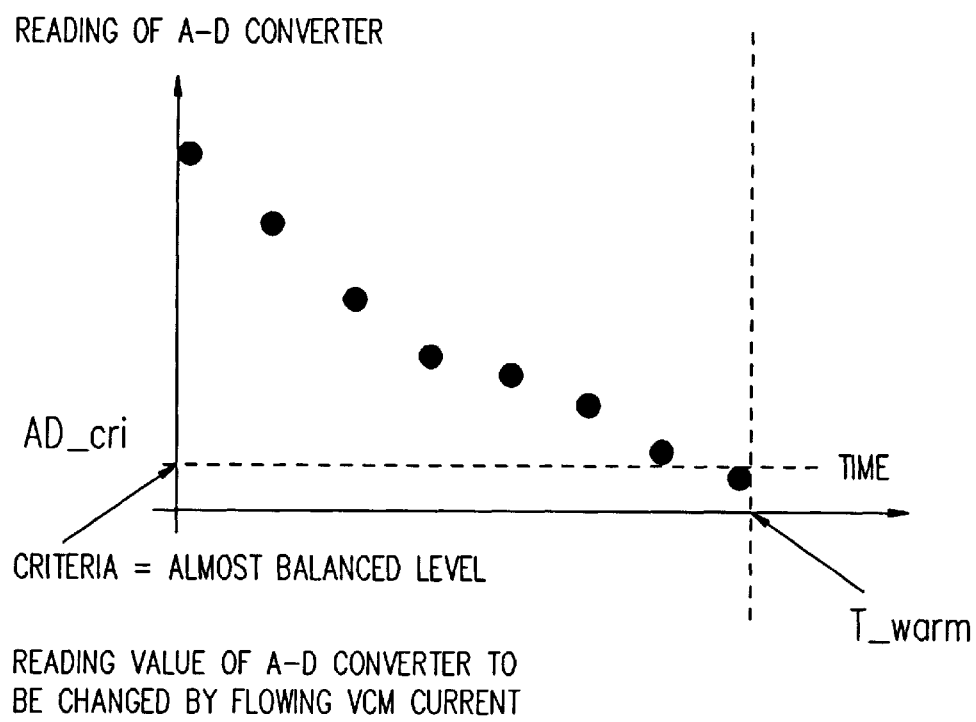
FIG. 20 is an illustration showing the reading values of the AD converter of the disk drive in FIG. 16 to be changed by flowing the VCM current of the disk drive.

Then, in step 650, the reading of the AD converter is measured by applying the heating-up VCM current I_vcm. In this case, when assuming the obtained AD converter measurement value as r1, the relation between VCM current and AD converter value is shown by "a" in FIG. 17. FIG. 20 is an illustration showing the reading value of an AD converter to be changed by supplying a VCM current. As shown in FIG. 20, by supplying the VCM current, a VCM coil is warmed and the reading value of the AD converter decreases. This is shown by the fact that the characteristic "a" changes to the characteristic "b" in the case of the relation between the VCM current and the AD converter value in FIG. 17.

Then, in step 660, the absolute value ($|r1-r0|$) of the difference between AD converter measurement values showing a balance level is compared with criteria to judge whether cold unbalance is present. For example, the absolute value is compared with predetermined criteria AD_cri under the state shown by "a" in FIG. 17 and when the balance level ($|r1-r0|$) is larger than the criteria AD_cri, cold unbalance requiring warming is decided.

In the case of cold unbalance, it is judged in step 670 whether time-out occurs. Unless time-out occurs, time is up (t=t+dt) for a predetermined period in step 680 and then, step 640 is restarted, and the above processing is repeated until time-out occurs. By applying a current within the time-out period after the timer is started and eliminating the cold unbalance, it is possible to prevent current application from excessively continuing. Even when the cold unbalance is not eliminated within the time-out period, the next step 690 is started so as to perform calibration control even though a dynamic range is narrow.

Figure 21:
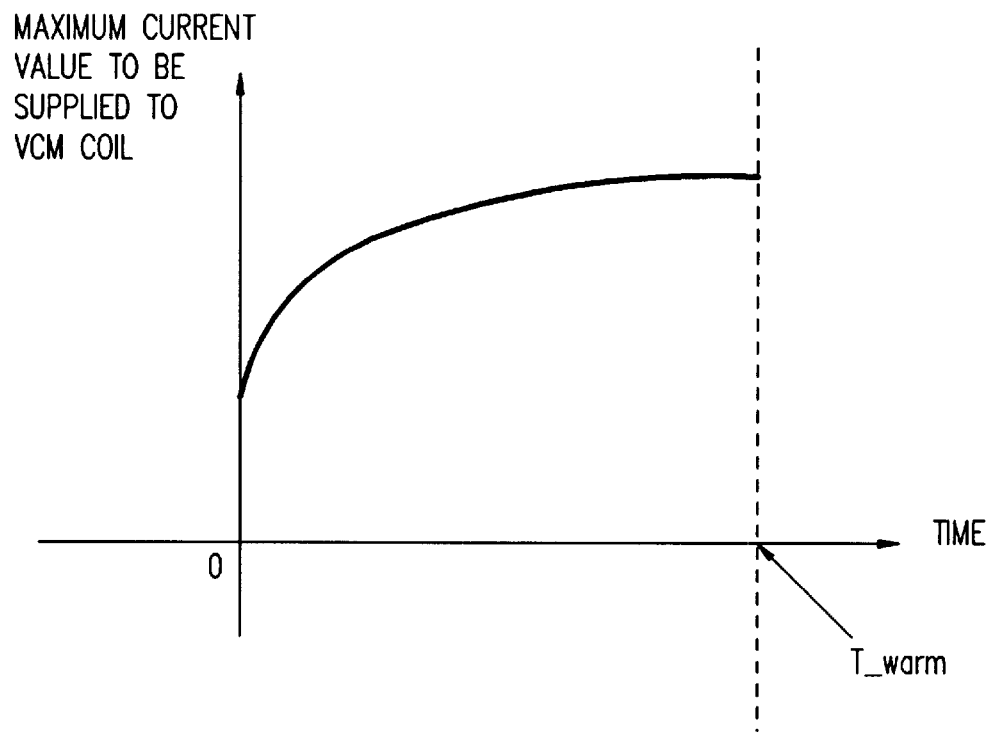
FIG. 21 is a characteristic diagram showing the change of allowable maximum current values to be improved by flowing the VCM current of the disk drive in FIG. 16.

FIG. 21 is a characteristic diagram showing the change of allowable maximum current values to be improved by supplying a VCM current. As shown in FIG. 21, as the temperature of a VCM coil approaches ordinary temperature, the inclination of the linear area shown in FIG. 17 decreases and it is possible to increase a maximum amount of current to be supplied to the VCM coil.

In FIG. 18, when time-out occurs in step 670, dR is measured in accordance with the equation (6) as the calibration control in step 690. For example, as the calibration control, the calibration according to the dynamic range measurement by the first embodiment or the calibration according to the offset measurement by the second embodiment is performed.

When the calibration control is completed, the speed control of an actuator is started in step 700 and this flow is completed.

As described above, the disk drive 40 of the third embodiment comprises a CPU 41 for performing calibration control and controlling operations of an actuator, a VCM driver 42 for driving a VCM in accordance with the VCM current supplied from the CPU 41, a VCM coil 43 to be turned on by the VCM driver 42, a back-electromotive-voltage detection circuit 44 for detecting a back electromotive voltage generated in the VCM coil 43, and an AD converter 45 for converting the output V_out of the back-electromotive-voltage detection circuit 44 into a digital signal. The back-electromotive-voltage detection circuit 44 comprises an operational amplifiers OP1 and OP2, balance resistances R0 and Rg, resistances R1 to R6, and output terminal V_out. Moreover, when assuming the resistance of the VCM coil 43 as R_vcm and the output-terminal resistance of the VCM driver 42 connected with R_vcm in series as Rsens, the operational amplifier OP1 and the resistances R_vcm, RS, RD, and Rg constitute a bridge circuit as a whole so that the bridge circuit is balanced in accordance with the resistance value R_vcm of the coil when the coil has ordinary temperature. Therefore, even if there is a temperature change, it is possible to remove an unstable factor of speed control that a head or slider damages a disk and improve the reliability of a hard disk by further stably loading or unloading the head onto or from a ramp.

That is, in the case of a conventional example, balance collapses due to coil temperature rise, a maximum current is limited, thereby a sufficient amount of current against the friction of a ramp cannot be obtained, and thus an unstable factor is added to the speed control of a disk by a head. In the case of this embodiment, however, because a balance point meeting the equation (9) is brought to a position where a VCM coil has ordinary temperature or a temperature slightly higher than the ordinary temperature. Therefore, it is possible to maximize a dynamic range at ordinary temperature and increase a maximum allowable current to be applied to the VCM coil.

Moreover, in the case of this embodiment, the degree of balance is checked before loading and a proper current is supplied to a VCM coil until balance is obtained to a certain extent. Therefore, it is possible to perform a proper loading/unloading control even under a low-temperature environment when a power supply is turned on in a cold district or in the morning in winter and quickly start the speed control of an actuator.

In the case of this embodiment, a balance point meeting the equation (9) is brought to a position where a VCM coil has ordinary temperature or a temperature slightly higher than ordinary temperature. In short, however, any temperature can be used as long as a maximum allowable current can be flown at a position close to the operating environment temperature of a hard disk drive and the range of ordinary temperature can take various values.

Moreover, in the case of the above embodiments, a case is described in which the present invention is applied to an HDD. However, the present invention can be applied to any apparatus having a loading/unloading mechanism in addition to the HDD. Furthermore, it is needless to say that the present invention can be used for a loading/unloading apparatus and the advantage same as that of each of the above embodiments can be obtained.

Furthermore, the above embodiments use a rectangular current as a coil current. However, it is needless to say that current application is an example.

Furthermore, it is needless to say that the types and the number of HDCs, loading/unloading mechanisms, and resistances constituting the above disk drive are not restricted to the above embodiments.

In the case of a disk drive, loading/unloading apparatus, and method for controlling the apparatus of the present invention, calibration means for measuring the dynamic range of AD conversion means is used and control means performs speed control in accordance with the measured dynamic range. Therefore, it is possible to detect an effective linear operation range and improve the reliability of data by performing stable speed control.

In the case of a disk drive, loading/unloading apparatus, and method for controlling the apparatus of the present invention, calibration means for measuring the offset of AD conversion means is used and control means performs speed control in accordance with the measured offset. Therefore, even if there is a disturbance such as vibration or voltage fluctuation, it is possible to detect an accurate offset value and improve the reliability of loading/unloading a head and the reliability of data.

In the case of a disk drive, loading/unloading apparatus, and method for controlling the apparatus of the present invention, back-electromotive-voltage detection circuit is provided with a bridge circuit for detecting a voltage generated in the coil of a voice coil motor as a back electromotive voltage by balancing the resistance of the coil with a predetermined resistance so as to balance the bridge circuit in accordance with the resistance value of the coil when the coil has ordinary temperature. Therefore, even if there is a temperature change, it is possible to remove an unstable factor of speed control that a head or slider damages a disk and improve the reliability of a hard disk by more stably loading or unloading the head onto or from a ramp.

What is claimed is:

1. A disk drive comprising:
   a head for reading or writing data from or into a disk recording medium;
   a loading/unloading mechanism for loading or unloading said head onto or from said recording medium by driving said head with an actuator provided with a voice coil motor;
   back-electromotive-voltage detection means for detecting a back electromotive force generated in said voice coil motor;
   AD conversion means for converting the detected back-electromotive voltage into a digital signal; and
   control means for controlling the speed of said actuator by using the AD-converted back electromotive voltage value as a control object; wherein
   calibration means for measuring the dynamic range of said AD conversion means is included, and
   said control means controls speed in accordance with the measured dynamic range.

2. The disk drive according to claim 1, wherein said speed control is loading/unloading control.

3. The disk drive according to claim 1, wherein said speed control is speed control of an actuator.

4. The disk drive according to claim 1, wherein said dynamic range is a linear region until reaching a predetermined nonlinear region.

5. The disk drive according to claim 1, wherein said calibration means increases a rectangular current value to be applied to a voice coil while successively changing codes, and measures a dynamic range in accordance with the saturation level of the value of said AD conversion means for each current value.

6. The disk drive according to claim 1, wherein said calibration means increases a rectangular current value to be applied to a voice coil while successively changing codes, and measures a dynamic range in accordance with the change rate of the value of said AD conversion means for each current value.

7. The disk drive according to claim 1, wherein said calibration means applies a predetermined current value to a voice coil and increases the applied current value while successively changing codes, and measures a dynamic range in accordance with the saturation level of the value of said AD conversion means for each current value.

8. The disk drive according to claim 1, wherein said calibration means applies a predetermined current value to a voice coil and increases the applied current value while successively changing codes, and measures a dynamic range in accordance with the change rate of the value of said AD conversion means for each current value.

9. The disk drive according to claim 1, wherein said calibration means decides a nonlinear region when the difference between the expected value and measured value of said AD conversion means becomes a predetermined value or more.

10. The disk drive according to claim 1, wherein said calibration means stores the measured value of said AD conversion means as a past value and uses the stored past value by deciding a nonlinear region when the difference between the expected value and measured value of said AD conversion means becomes a predetermined value or more.

11. The disk drive according to claim 1, wherein said calibration means increases a rectangular current value to be applied to a voice coil while successively changing codes, and measures an offset in accordance with the value of said AD conversion means for each current value.

12. The disk drive according to claim 1, wherein said calibration means increases a rectangular current value to be applied to a voice coil while successively changing codes, and measures an offset in accordance with the median value of both polarities of said AD conversion means for each current value.

13. The disk drive according to claim 1, wherein said calibration means detects an effective operating range of hardware.

14. The disk drive according to claim 1, wherein said calibration means detects a current to be supplied to said voice coil motor and the linear region of the value of said AD conversion means.

15. The disk drive according to claim 1, wherein the measurement by said calibration means is performed immediately before loading/unloading control.

16. The disk drive according to claim 1, wherein the measurement by said calibration means is performed every time before loading/unloading control is started.

17. The disk drive according to claim 1, wherein the measurement by said calibration means is performed on a ramp before loading control is started.

18. The disk drive according to claim 1, wherein the measurement by said calibration means is performed immediately before actuator speed control.

19. A disk drive comprising:
   a head for reading or writing data from or into a disk recording medium;
   a loading/unloading mechanism for loading or unloading said head onto or from said recording medium by driving said head with an actuator provided with a voice coil motor;
   back-electromotive-voltage detection means for detecting a back electromotive force generated in said voice coil motor;
   AD conversion means for converting the detected back-electromotive voltage into a digital signal; and
   control means for controlling the speed of said actuator by using the AD-converted back electromotive voltage value as a control object; wherein
   calibration means for measuring the offset of said AD conversion means is included, and
   said control means controls speed in accordance with a measured offset.

20. The disk drive according to claim 19, wherein said speed control is loading/unloading control.

21. The disk drive according to claim 19, wherein said speed control is speed control of an actuator.

22. The disk drive according to claim 19, wherein said calibration means increases a rectangular current value to be applied to a voice coil while successively changing codes, and measures a dynamic range in accordance with the saturation level of the value of said AD conversion means for each current value.

23. The disk drive according to claim 19, wherein said calibration means increases a rectangular current value to be applied to a voice coil while successively changing codes, and measures a dynamic range in accordance with the change rate of the value of said AD conversion means for each current value.

24. The disk drive according to claim 19, wherein said calibration means applies a predetermined current value to a voice coil and increases the applied current value while successively changing codes, and measures a dynamic range in accordance with the saturation level of the value of said AD conversion means for each current value.

25. The disk drive according to claim 19, wherein said calibration means applies a predetermined current value to a voice coil and increases the applied current value while successively changing codes, and measures a dynamic range in accordance with the change rate of the value of said AD conversion means for each current value.

26. The disk drive according to claim 19, wherein said calibration means decides a nonlinear region when the difference between the expected value and measured value of said AD conversion means becomes a predetermined value or more.

27. The disk drive according to claim 19, wherein said calibration means stores the measured value of said AD conversion means as a past value and uses the stored past value by deciding a nonlinear region when the difference between the expected value and measured value of said AD conversion means becomes a predetermined value or more.

28. The disk drive according to claim 19, wherein said calibration means increases a rectangular current value to be applied to a voice coil while successively changing codes, and measures an offset in accordance with the value of said AD conversion means for each current value.

29. The disk drive according to claim 19, wherein said calibration means increases a rectangular current value to be applied to a voice coil while successively changing codes, and measures an offset in accordance with the median value of both polarities of said AD conversion means for each current value.

30. The disk drive according to claim 19, wherein said calibration means supplies a plurality of currents (excluding zero) to a voice coil, and measures the value of said AD conversion means when an applied current is zero as an offset by means of the primary interpolation in accordance with the value of said AD conversion means for each current value.

31. The disk drive according to claim 19, wherein said calibration means supplies a first current and a second current to a voice coil, includes means for measuring the value of said AD conversion means when an applied current is zero as an offset by means of the primary interpolation in accordance with the value of said AD conversion means for each current value, the value of said first current is an optimum value in a dynamic range, and the value of said second current is a minimum value for supplying a force to an actuator so that said actuator is not influenced by vibrations from the outside.

32. The disk drive according to claim 19, wherein said calibration means supplies a first current and a second current to a voice coil, includes means for measuring the value of said AD conversion means when an applied current is zero as an offset by means of the primary interpolation in accordance with the value of said AD conversion means for each current value, the value of said first current is an optimum value in a dynamic range, and the value of said second current is a minimum value for supplying a force to an actuator so that the minimum value is not influenced by the voltage fluctuation of said back-electromotive-voltage detection circuit and said actuator is not influenced by vibrations from the outside.

33. The disk drive according to claim 19, wherein the measurement by said calibration means is performed immediately before loading/unloading control.

34. The disk drive according to claim 19, wherein the measurement by said calibration means is performed every time before loading/unloading control is started.

35. The disk drive according to claim 19, wherein the measurement by said calibration means is performed on a ramp before loading control is started.

36. The disk drive according to claim 19, wherein the measurement by said calibration means is performed at the innermost track on a disk before unloading control is started.

37. The disk drive according to claim 19, wherein the measurement by said calibration means is performed immediately before actuator speed control.

38. A disk drive comprising:
a head for reading or writing data from or into a disk recording medium;
a loading/unloading mechanism for loading or unloading said head onto or from said recording medium by driving said head with an actuator provided with a voice coil motor;
back-electromotive-voltage detection means for detecting a back electromotive force generated in said voice coil motor;
AD conversion means for converting the detected back-electromotive voltage into a digital signal; and
control means for controlling the speed of said actuator by using the AD-converted back electromotive voltage value as a control object; wherein
said back-electromotive-voltage detection means is provided with a bridge circuit for detecting a voltage generated in the coil of said voice coil motor as a back electromotive voltage by balancing the resistance of said coil with a predetermined resistance, and said bridge circuit is balanced in accordance with the resistance value of said coil when the temperature of said coil is kept at ordinary temperature.

39. The disk drive according to claim 38, wherein said bridge circuit is constituted so as to be balanced in accordance with the resistance value of said coil when the coil has ordinary temperature and makes it possible to apply a maximum current to said coil by excluding the influence of the resistance value of said coil when the circuit is balanced.

40. The disk drive according to claim 38, wherein means for judging the degree of said balance is included, and a current is supplied to said coil until a predetermined balance degree is obtained.

41. The disk drive according to claim 38, wherein means for judging the degree of said balance is included, the balance judgment is performed before said loading/unloading control, and balance is improved by supplying a current to said coil until the degree of a predetermined balance is obtained when the predetermined balance is not realized.

42. A loading/unloading apparatus provided with a head for reading or writing data from or into a disk recording medium to load or unload said head onto or from said recording medium by driving said head with an actuator provided with a voice coil motor, the apparatus comprising:
back-electromotive-voltage detection means for detecting a back electromotive force generated in said voice coil motor;
AD conversion means for converting the detected back-electromotive voltage into a digital signal;
control means for controlling the speed of said actuator by using the AD-converted back electromotive voltage value as a control object; and
calibration means for measuring the dynamic range of said AD conversion means;
wherein said calibration means increases a rectangular current value to be applied to a voice coil while successively changing codes, and
measures a dynamic range in accordance with the saturation level of the value of said AD conversion means for each current value.

43. The loading/unloading apparatus according to claim 42, wherein said calibration means stores the measured value of said AD conversion means as a past value and uses the past value stored by deciding a nonlinear region when the difference between the expected value and measured value of said AD conversion means becomes a predetermined value or more.

44. A loading/unloading apparatus provided with a head for reading or writing data from or into a disk recording medium to load or unload said head onto or from said recording medium by driving said head with an actuator provided with a voice coil motor, the apparatus comprising:
back-electromotive-voltage detection means for detecting a back electromotive force generated in said voice coil motor;
AD conversion means for converting the detected back-electromotive voltage into a digital signal;
control means for controlling the speed of said actuator by using the AD-converted back electromotive voltage value as a control object; and
calibration means for measuring the offset of said AD conversion means;
wherein said calibration means increases a rectangular current value to be applied to a voice coil while successively changing codes, and measures an offset in accordance with the value of said AD conversion means for each current value.

46. The loading/unloading apparatus according to claim 44, wherein said calibration means increases a rectangular current value to be applied to a voice coil while successively changing codes, and measures an offset in accordance with the median value of both polarities of said AD conversion means for each current value.

46. A loading/unloading apparatus provided with a head for reading or writing data from or into a disk recording medium to load or unload said head onto or from said recording medium by driving said head with an actuator provided with a voice coil motor, the apparatus comprising:

back-electromotive-voltage detection means for detecting a back electromotive force generated in said voice coil motor;

AD conversion means for converting the detected back-electromotive voltage into a digital signal;

control means for controlling the speed of said actuator by using the AD-converted back electromotive voltage value as a control object; and calibration means for measuring the offset of said AD conversion means;

wherein said calibration means supplies a plurality of currents (excluding zero) to a voice coil, measures the value of said AD conversion means when an applied voltage is zero as an offset by means of the primary interpolation in accordance with the value of said AD conversion means for each current value.

47. The loading/unloading apparatus according to claim 46, wherein said calibration means supplies a first current and a second current to a voice coil, includes means for measuring the value of said AD conversion means when an applied current is zero as an offset by means of the primary interpolation in accordance with the value of said AD conversion means for each current value, the value of said first current is an optimum value in a dynamic range, and the value of said second current is a minimum value for supplying a force to an actuator so that the actuator is not influenced by vibrations from the outside.

48. A loading/unloading apparatus provided with a head for reading or writing data from or into a disk recording medium to load or unload said head onto or from said recording medium by driving said head with an actuator provided with a voice coil motor, the apparatus comprising:

back-electromotive-voltage detection means for detecting a back electromotive force generated in said voice coil motor;

AD conversion means for converting the detected back-electromotive voltage into a digital signal; and control means for controlling the speed of said actuator by using the AD-converted back electromotive voltage value as a control object;

wherein said back-electromotive-voltage detection means includes a bridge circuit for detecting a voltage generated in the coil of a voice coil motor as a back electromotive voltage by balancing the resistance of said coil with a predetermined resistance, and said bridge circuit is balanced in accordance with the resistance value of said coil when the coil has ordinary temperature.

49. The loading/unloading apparatus according to claim 48, wherein means for judging the degree of said balance is included, and a current is supplied to said coil until a predetermined balance degree is obtained.

50. A method for controlling a loading/unloading apparatus for performing the loading/unloading operation to load or unload a head for reading or writing data from or into a disk recording medium onto or from said recording medium by driving said head with an actuator provided with a voice coil motor and having;

back-electromotive-voltage detection means for detecting a back electromotive voltage generated in said voice coil motor, AD conversion means for converting the detected back-electromotive voltage into a digital signal, control means for controlling the speed of said actuator by using the AD-converted back electromotive voltage as a control object, and calibration means for measuring the dynamic range of said AD conversion means; the control method comprising the steps of:

judging the degree of a bridge circuit constituted so as to be balanced in accordance with the resistance value of a coil when said coil has ordinary temperature;

improving balance by supplying a current to said coil until a predetermined balance is obtained when said predetermined balance is not realized;

increasing a rectangular current value to be applied to a voice coil while successively changing codes, measuring an offset in accordance with the value of said AD conversion means for each current value, and measuring a dynamic range in accordance with the saturation level of the value of said AD conversion means for each current value, and executing loading/unloading control in accordance with a measured result.

* * * * *